United States Patent
Crudele et al.

(10) Patent No.: US 6,973,647 B2
(45) Date of Patent: Dec. 6, 2005

(54) PREFERABLE MODES OF SOFTWARE PACKAGE DEPLOYMENT

(75) Inventors: Michele Crudele, Isernia (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/766,811

(22) Filed: Jan. 22, 2001

(65) Prior Publication Data

US 2002/0010910 A1 Jan. 24, 2002

(30) Foreign Application Priority Data

Jul. 15, 2000 (GB) .................................... 0017336

(51) Int. Cl.[7] ............................................ G06F 9/445
(52) U.S. Cl. ..................................................... 717/177
(58) Field of Search ........ 717/168–178; 709/213–222, 709/106, 203; 345/749

(56) References Cited

U.S. PATENT DOCUMENTS

| | | | |
|---|---|---|---|
| 5,519,866 A | * | 5/1996 | Lawrence et al. .......... 717/162 |
| 5,845,090 A | * | 12/1998 | Collins et al. ............... 709/221 |
| 6,014,666 A | * | 1/2000 | Helland et al. ................. 707/9 |
| 6,389,589 B1 | * | 5/2002 | Mishra et al. ............... 717/170 |
| 6,425,005 B1 | * | 7/2002 | Dugan et al. ............... 709/223 |
| 6,505,228 B1 | * | 1/2003 | Schoening et al. ......... 718/106 |

OTHER PUBLICATIONS

SmartUpdate, "SmartUpdate Developer's Guide", 1999, "http://developer.netscape.com/docs/manuals/communicator/jarman/install.htm".*

SmartUpdate Developer's Guide, pp. 1-14, <http:web.archive.org/web/20000615074832/http://developer.netscape.com/docs/manuals/communicator/jarman/install.htm.*

Waybackmachine search results Jan. 01, 1998- Nov. 29, 2004, 1 page.*

* cited by examiner

*Primary Examiner*—Kakali Chaki
*Assistant Examiner*—Tuan A. Vu
(74) *Attorney, Agent, or Firm*—Ido Tuchman; Rafael Perez-Pineiro

(57) ABSTRACT

A software distribution system comprises building blocks including a preparation and test site, comprising a software package editor, software package transformation tools and an AutoPack module for preparing and testing software packages to be distributed to endpoints. A software package comprises a file including a complete definition of the actions involved in a software distribution and, once distributed, when a software package is available to a target endpoint, an engine resident on the target can be instructed via the management agent to decode the software package from the file into memory and then to perform various software distribution operations including installing, removing and modifying the software and configuration of the endpoint.

12 Claims, 27 Drawing Sheets

| Object related actions | Registry Key and Value |
| --- | --- |
| | Shell Folder and Shortcut |
| | INI file Section and Item |
| | NT Service |
| | Profile Item |
| | Desktop Object, Folder, Program, Shadow |
| | Directory and File |
| | Text file line, command, token |
| | Symbolic link |

| System actions and Checks | Restart |
| --- | --- |
| | Check disk space |

| Program actions | Execute user program |
| --- | --- |
| | Execute MS Setup program |
| | Execute InstallShield program |
| | Execute CID Program |

Figure 7

```
"TME 10 Software Package v4.0 - SPDF" ◄── Signature of SPD
package
    name    = "Software Package"
    version = "1.0"

check_disk_space
        volume = C:,25M
        volume = D:,35M
    end generic_container ──────────── Container stanza
        condition = "$(os_name) == Windows_NT"

add win_registry_key parent_key = HKEY_LOCAL_MACHINE\SOFTWARE
            key = "Registry Key"

win_registry_key
                key = "Nested Registry Key" ◄── Attribute value pair
            end
        end
    end
end
```

Figure 10

```
...
add directory
    location     = c:/Winnt/System32/
    destination  = c:/Winnt/System32/ file
        name = MyApp.DLL
    end
end add directory
    location     = c:/MyApp
    destination  = c:/MyApp
    descend_dirs = y
end
...
```

Figure 12A

```
...
add directory
    location     = c:/Winnt/System32/
    destination  = $(system_dir)

file
        name = MyApp.DLL
    end
end add directory
    location     = c:/MyApp
    destination  = $(target_dir)
    descend_dirs = y
end
...
```

Figure 12B

```
...
add directory
    condition = "$(os_name) LIKE 'Win*'"
    location    = c:/winnt/system32
    destination = $(system_dir)
    file
        name = MyApp.DLL
    end
end
add directory
    condition = "$(os_name) == SunOS OR $(os_name) == AIX"
    location    = c:/unix/
    destination = $(home_path)
    file
        name = MyApp.a
    end
end
...
```

Figure 12C

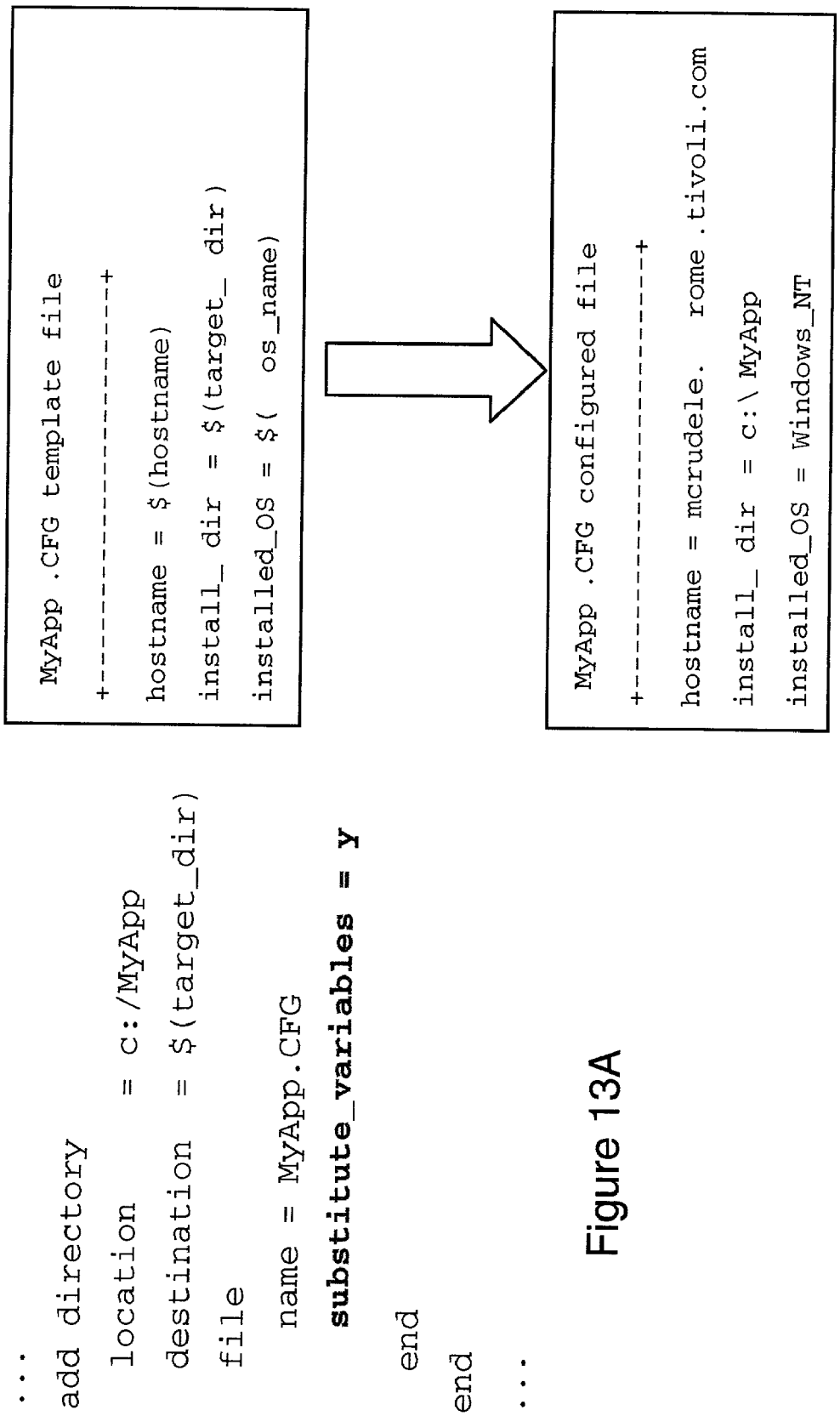

| | |
|---|---|
| wdcrtsp | Create a SPB file from a SPD file |
| wdexptsp | Export a SPB file into SPD file |
| wdbldspb | Build a SPB file from a SP |
| autopack | Run AutoPack snapshots/differences |
| wdinstsp | Install a SPB |
| wdrmvsp | Remove a SP |
| wdcmmtsp | Commit a SP |
| wdundosp | Undo a SP Install/Remove |
| wdacptsp | Accept an undoable Install/Remove |
| wdversp | Verify the state of a SP |

Figure 15

| | |
|---|---|
| wimpspo | Associate a Software Package to a SPO |
| wconvspo | Convert the format of a SPO |
| wexpspo | Export a SPO into SPD file |
| wldsp | Loads SP on one or more Depots |
| wuldsp | UnLoad a SP from one or more Depots |
| winstsp | Install a SP |
| wremovsp | Remove a SP |
| wcommtsp | Commit a SP |
| wundosp | Undo a SP Install/Remove |
| waccptsp | Accept an undoable Install/Remove |
| wversp | Verify the state of a SP |

Figure 16

|  | Install | Remove | Accept | Undo | rollBack | Commit | Verify |
|---|---|---|---|---|---|---|---|
| transactional | X | X |  |  |  |  |  |
| undoable | X | X |  | X |  |  |  |
| undoable in transactional | X | X |  |  |  |  |  |
| transactional & undoable | X | X |  |  |  |  |  |

Figure 19

| Operation | State | Undo state | Reboot state | Flag |
|---|---|---|---|---|
| Install | Prepared | Prepared | ReBoot requested | Changing |
| Remove | Committed | Undoable | - | In Error |
|  |  | Restored |  | - |

IC--- means that an Install has been committed
ICU-- means that an Install has been committed and can be undone
IP-BC means that an Install has been prepared and it will be committed during the next reboot
RCU-- means that a Remove has been committed but it can be undone
IC--E means that an Install has been committed but the SP is in error, so the application may not work properly

Figure 20

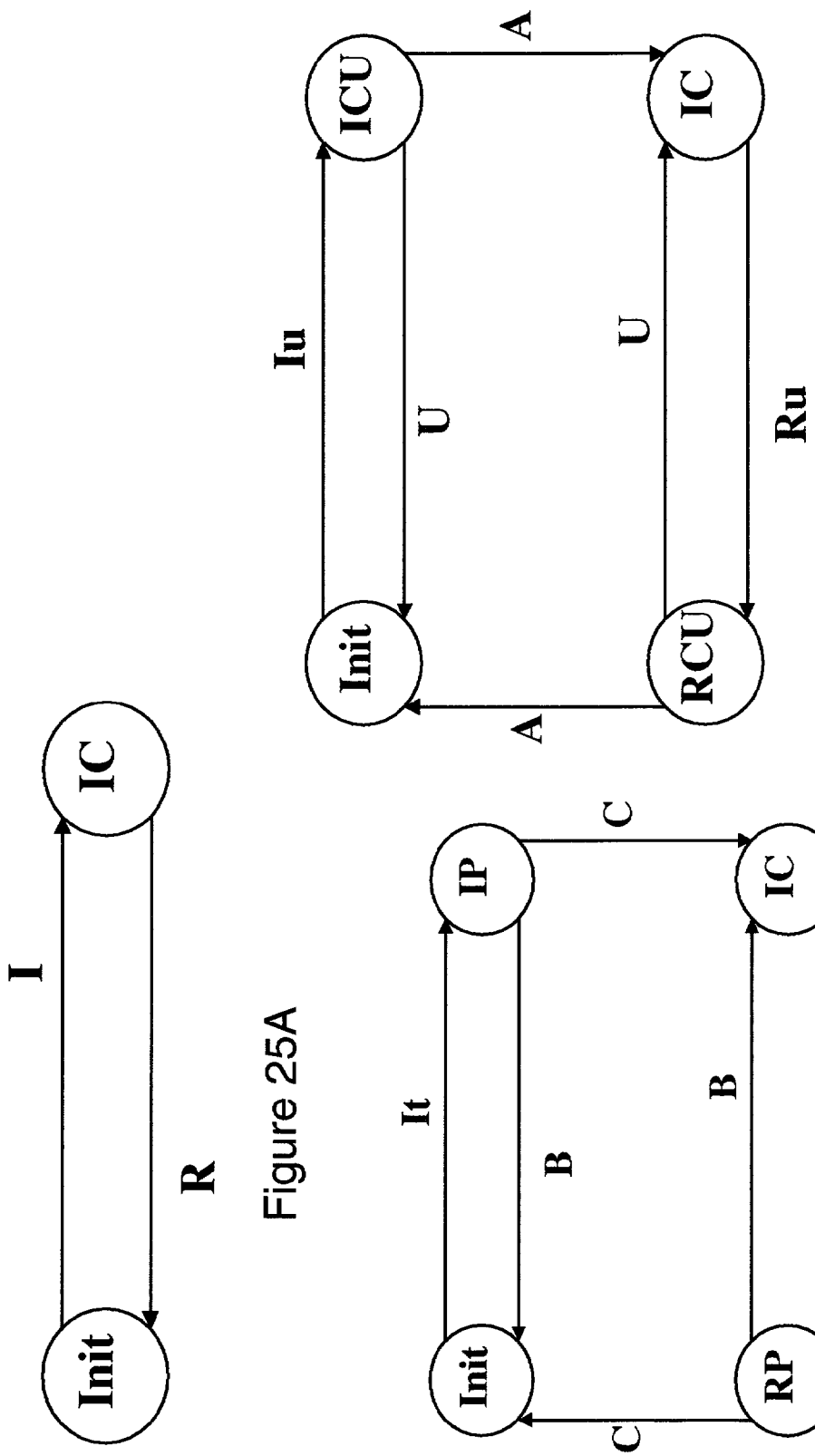

```
...
Mount the image directory
execute_user_program
    during_install
        name      = $(system_dir)/NET.EXE
        arguments = "USE $(freedrive_01) $(remote_name)"
    end
end
Run the setup to perform the installation
execute_mssetup_program
    during_install
        name      = $(freedrive_01)/setup.exe
        arguments = "/Q1 /B1"
    end
end
U-mount the image directory
execute_user_program
    during_install
        name      = $(system_dir)/NET.EXE
        arguments = "$(freedrive_01) /d"
    end
end
...
```

Figure 27

PREFERABLE MODES OF SOFTWARE PACKAGE DEPLOYMENT

Related subject matter may be found in the following commonly assigned, U.S. Patent Applications, which are hereby incorporated by reference herein:

Ser. No. 09/460,855 (AT9-99-275), entitled "APPARATUS FOR DATA DEPOTING AND METHOD THEREFOR", now issued as U.S. Pat. No. 6,772,158;

Ser. No. 09/460,853 (AT9-99-276), entitled "APPARATUS FOR RELIABLY RESTARTING INTERRUPTED DATA TRANSFER AT LAST SUCCESSFUL TRANSFER POINT AND METHOD THEREFOR", now issued as U.S. Pat. No. 6,526,447;

Ser. No. 09/438,436 (AT9-99-655), entitled "APPARATUS FOR CONNECTION MANAGEMENT AND METHOD THEREFOR" and;

Ser. No. 09/458,268 (AT9-99-324), entitled "COMPUTER NETWORK CONTROL SYSTEMS AND METHODS", now issued as U.S. Pat. No. 6,615,274;

Ser. No. 09/460,852 (AT9-99-325), entitled "METHODS OF DISTRIBUTING DATA IN A COMPUTER NETWORK AND SYSTEMS USING THE SAME";

Ser. No. 09/458,269 (AT9-99-315), entitled "SYSTEMS AND METHODS FOR REAL TIME PROGRESS MONITORING IN A COMPUTER NETWORK", now issued as U.S. Pat. No. 6,704,782;

Ser. No. 09/460,851 (AT9-99-316), entitled "APPARATUS FOR AUTOMATICALLY GENERATING RESTORE PROCESS DURING SOFTWARE DEPLOYMENT AND METHOD THERFOR", now issued as U.S. Pat. No. 6,588,011;

Ser. No. 09/469,854 (AT9-99-323), entitled "AN APPARATUS FOR JOURNALING DURING SOFTWARE DEPLOYMENT AND METHOD THEREFOR", now issued as U.S. Pat. No. 6,604,237.

FIELD OF INVENTION

The present invention lies in the field of preparing and distributing software.

BACKGROUND OF THE INVENTION

A brief overview of a conventional Tivoli software distribution system and enterprise management system is shown in FIG. 1(a). Here, a Tivoli Management Region (TMR) server 10 communicates with a Tivoli management agent (TMA) 12 resident on an endpoint computer workstation 14 via a gateway 16 (only one shown). Detailed information about the features offered by Tivoli V3.6 are available at http://www.redbooks.ibm.com/pubs/pdfs/redbooks/sg242045.p df. In a Tivoli Management Environment (TME), each enabled endpoint 14 communicates with the gateway 16 via any peer-to-peer protocol, for example, TCP/IP, IPX or SNA. Communication between the server 10 and the gateway 16 is via an ORB, where each endpoint connected to a gateway is addressed by the server through an associated object on the gateway ORB, thus enabling the endpoint to be directly addressed by the server. The management agent 12, also known as a Lightweight Client Framework (LCF), resident on the endpoint, is thus accessible by the server and enables the server to push software via the gateway to the endpoint and call methods on applications 18 resident on the endpoint. The server in turn runs programs allowing: software to be selected for distribution to specified endpoints or defined groups of endpoints (targets); endpoint software inventories to be obtained; and endpoint activity to be monitored via an Event Console, and these programs are extended for each endpoint platform to be managed.

It is an object of the present invention to reduce the installation time and increase the dependability of installation of a software package.

DISCLOSURE OF THE INVENTION

According to the present invention there is provided a software deployment tool cooperable with a software package including a software package file incorporating at least one action defining respective modifications to said client processing system and at least one file required to implement said at least one modifying action, said tool comprising:

a plurality of classes, each class corresponding to a respective type of action;

means for reading said software package file and instantiating a class having attributes corresponding to the respective type of each of the at least one action of said software package file and setting the attributes of the at least one class according to the respective action definition in said software package file, means for executing a check method on at least one of each of said at least one class instances to determine if a deployment operation can be implemented in a specified first mode;

means, responsive to a successful check, for executing a method on each of said at least one class instances in said first mode; and means, responsive to check failure of any class instance, for executing a method on each of said at least one class instances in a second less preferable mode.

BRIEF DESCRIPTION OF THE DRAWINGS

Embodiments of the invention will now be described with reference to the accompanying drawings, in which:

FIG. 7 shows some examples of actions which can be performed on a target using the software package;

FIG. 10 shows an example of a software package definition (SPD) file;

FIGS. 12(a) to 12(c); and FIGS. 13(a) and 13(b) illustrate the use of variables within an SPD file;

FIGS. 15 and 16 are tables showing the commands available on the software distribution server and the software preparation site;

FIG. 19 shows a summary of the software package commands and their associated modes of operation;

FIG. 20 illustrates the states of a software package;

FIGS. 25(a) to 25(e) illustrate the state transitions of a software package;

FIG. 27 illustrates an SPD file for a redirected install.

DESCRIPTION OF THE PREFERRED EMBODIMENTS

Figure 1A:
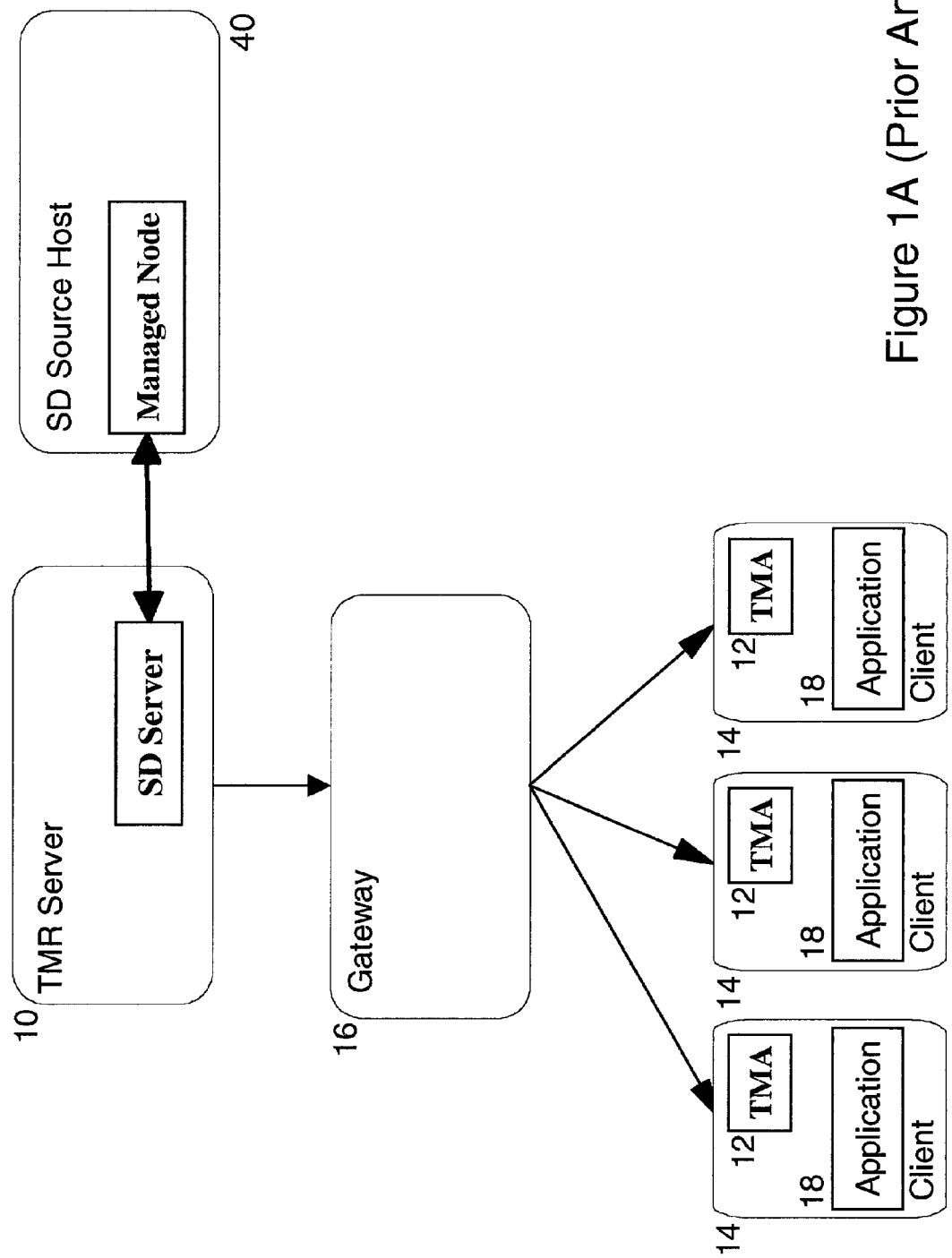
FIG. 1(a) illustrates a prior art software preparation and distribution system.
Figure 1B:
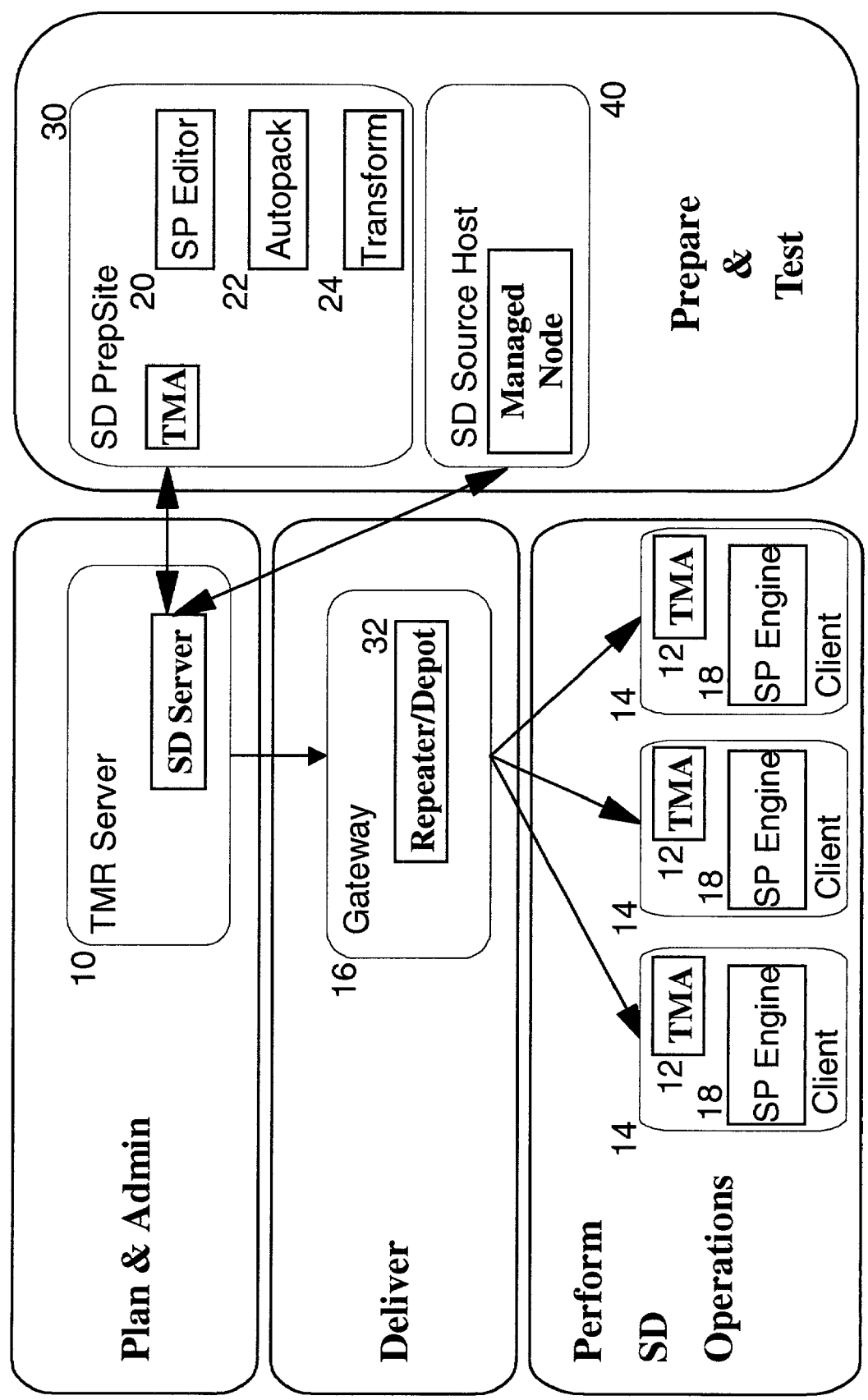
FIG. 1(b) illustrates a software preparation and distribution system according to a preferred embodiment of the invention.

Referring now to FIG. 1(b), wherein elements corresponding to those in FIG. 1(a) have like numerals, a software distribution system according to a preferred embodiment of the present invention is illustrated. The software distribution system comprises many building blocks, the first being a preparation and test site 30, comprising modules 20, 22, 24 for preparing and testing software packages to be distributed to endpoints 14. A software package comprises a file including a complete definition of the actions involved in a software distribution and, once distributed, when a software package is available to a target endpoint 14, an engine 18 resident on the target can be instructed via the management agent 12 to decode the software package from the file into memory and then to perform various software distribution operations including installing, removing and modifying the software and configuration of the endpoint 14.

Figure 2:
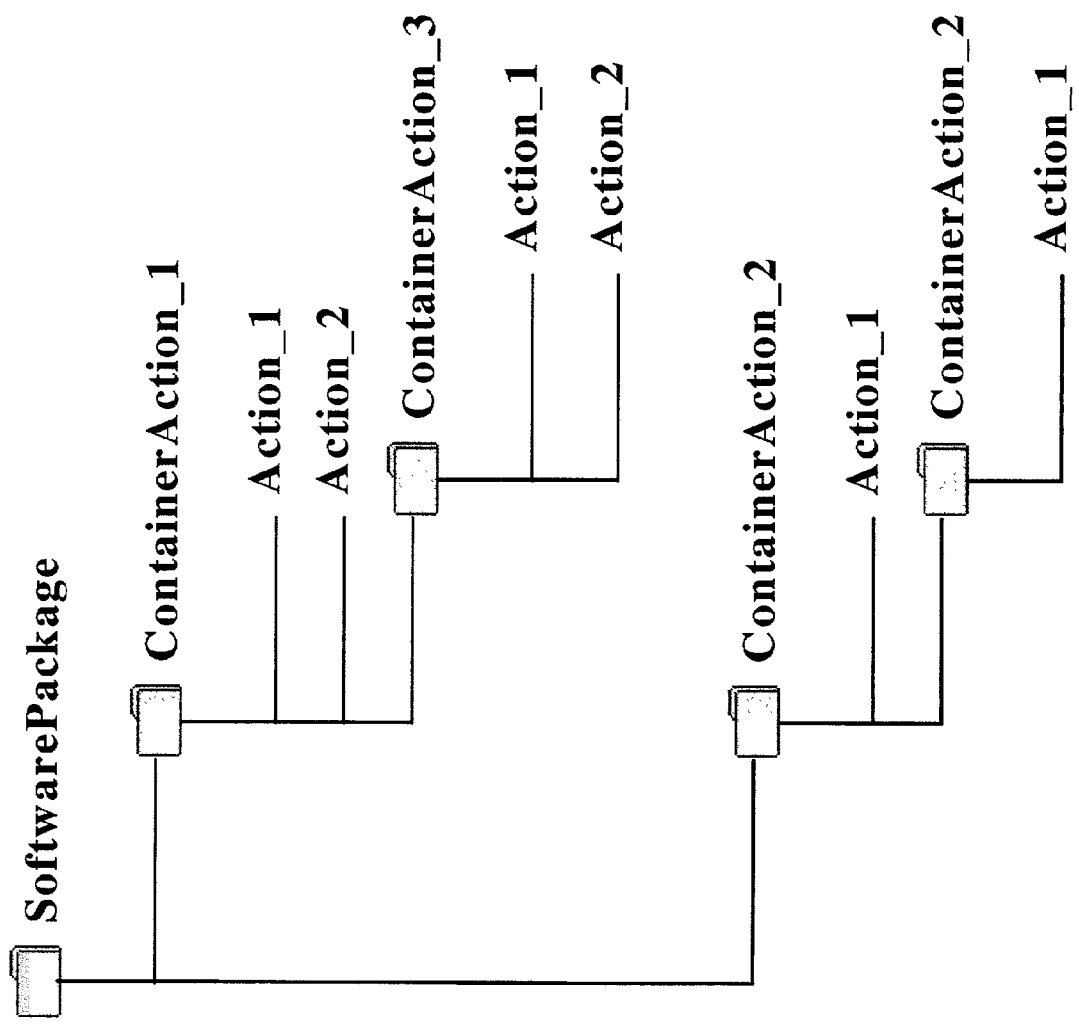
FIG. 2 illustrates the structure of a software package employed in a preferred embodiment of the invention.

In memory, the software package comprises a hierarchical structure of leaf and branch nodes capable of being traversed from parent to child in a top-down manner, FIG. 2. Each leaf node of the software package hierarchy corresponds to an action to be performed on a target system, for example, restart, add_file, remove_file. Some actions like restart are self-contained, whereas add_xxx or remove_xxx actions take a subject xxx referred to as an installable object. Installable objects are entities to be added to or removed from the target system, for example, file, registry_key or folder by an add or remove action. Branch nodes are referred to as containers and are actions comprising collections of child actions sharing the defaults of the container. At the root of the hierarchy is Software Package which is itself a container.

Figure 3:
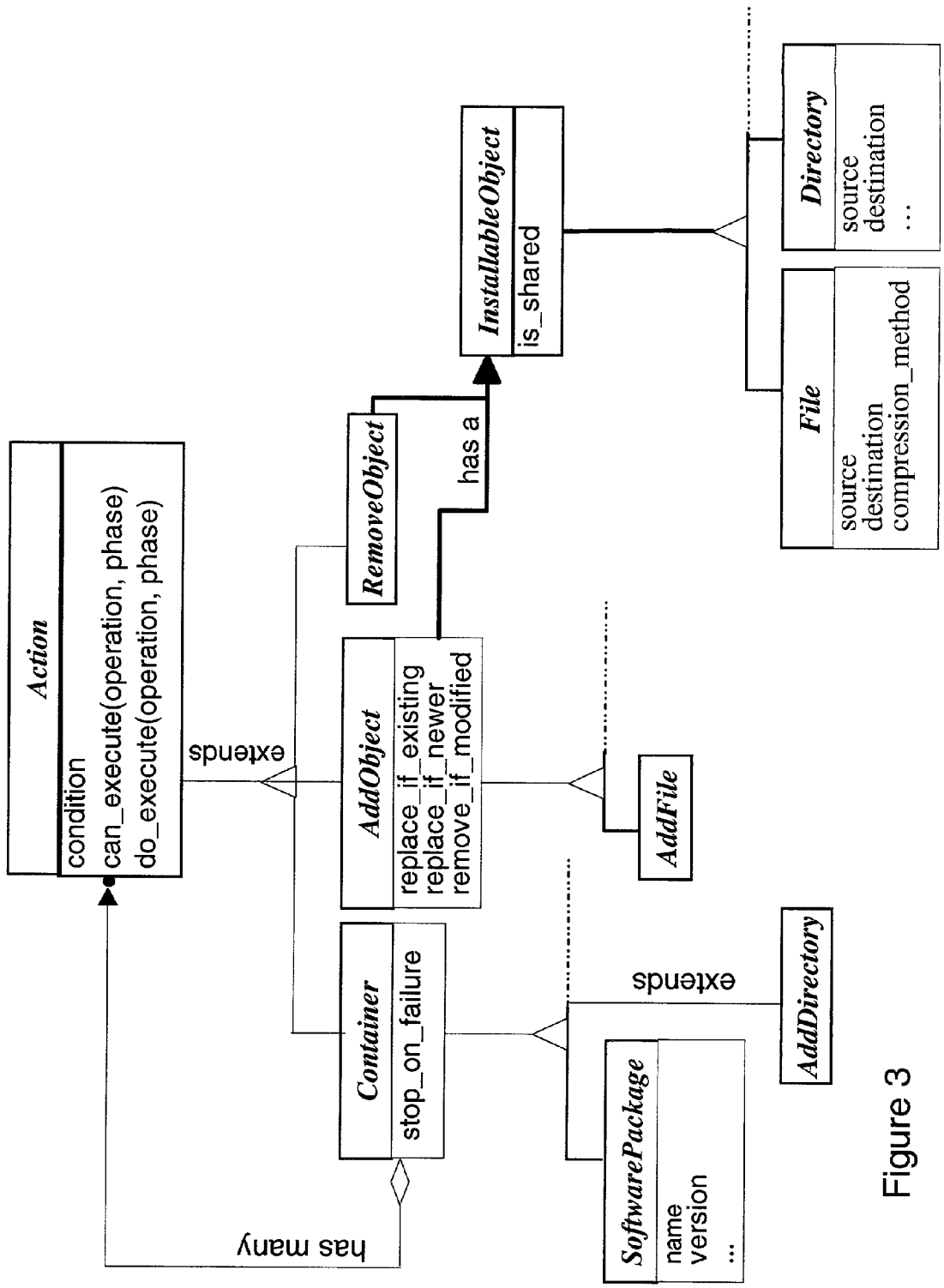
FIG. 3 illustrates a class hierarchy employed by an application for processing the software package of FIG. 2.

As a software package file is decoded by the software package engine 18 or other software package processing program, each node causes a class, extending the base classes of the class hierarchy of FIG. 3, to be instantiated. Actions without a subject, such as restart, correspond with classes which simply extend an Action class. Action exposes a number of properties and for the purposes of the present description, the most relevant of these is Condition comprising a Boolean expression. Thus, any Action in the software package may have a condition set. The Action is performed only if the condition evaluates to true during any software distribution operation. Valid operators are: Comparison operators: >, >=, <, <=, ==, !=; Boolean operators: NOT, OR, AND; and others: LIKE, CONTAINS. Valid operands are Constants and Variables explained later.

An instance of a Container class may have any number of instances of an Action class. Container itself extends Action and so its instances include all of the attributes of Action including Condition. Container has a further stop_on_failure attribute which is again set during the creation of the software package. This and Condition enable the result of an Action to condition the execution of its child Actions in the software package.

AddObject and RemoveObject also extend Action and are in turn extended by Actions having a subject, such as add_file. Each instance of AddObject and RemoveObject has one InstallableObject corresponding to the file, directory, registry key etc. subject to the add or remove action. AddObject has a number of properties: replace_if_existing, replace_if_newer and remove_if_modified, whose values are set during the creation of the software package; for the purpose of file version control. Except for replace_if_newer, which is meaningful only for files, these attributes are supported by all AddObject implementing Actions.

Figure 4:
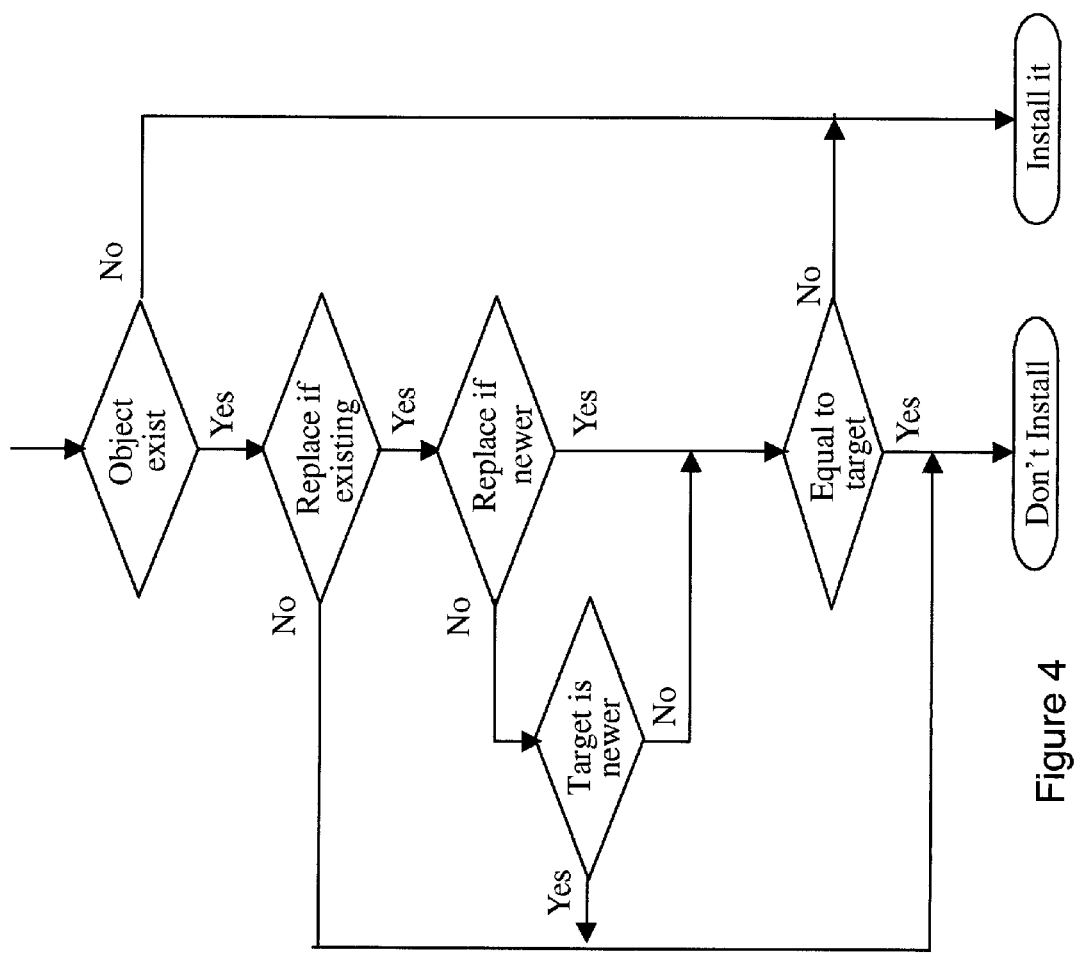
FIGS. 4 to 6 illustrate the operation of install; remove and checking commands.
Figure 5:
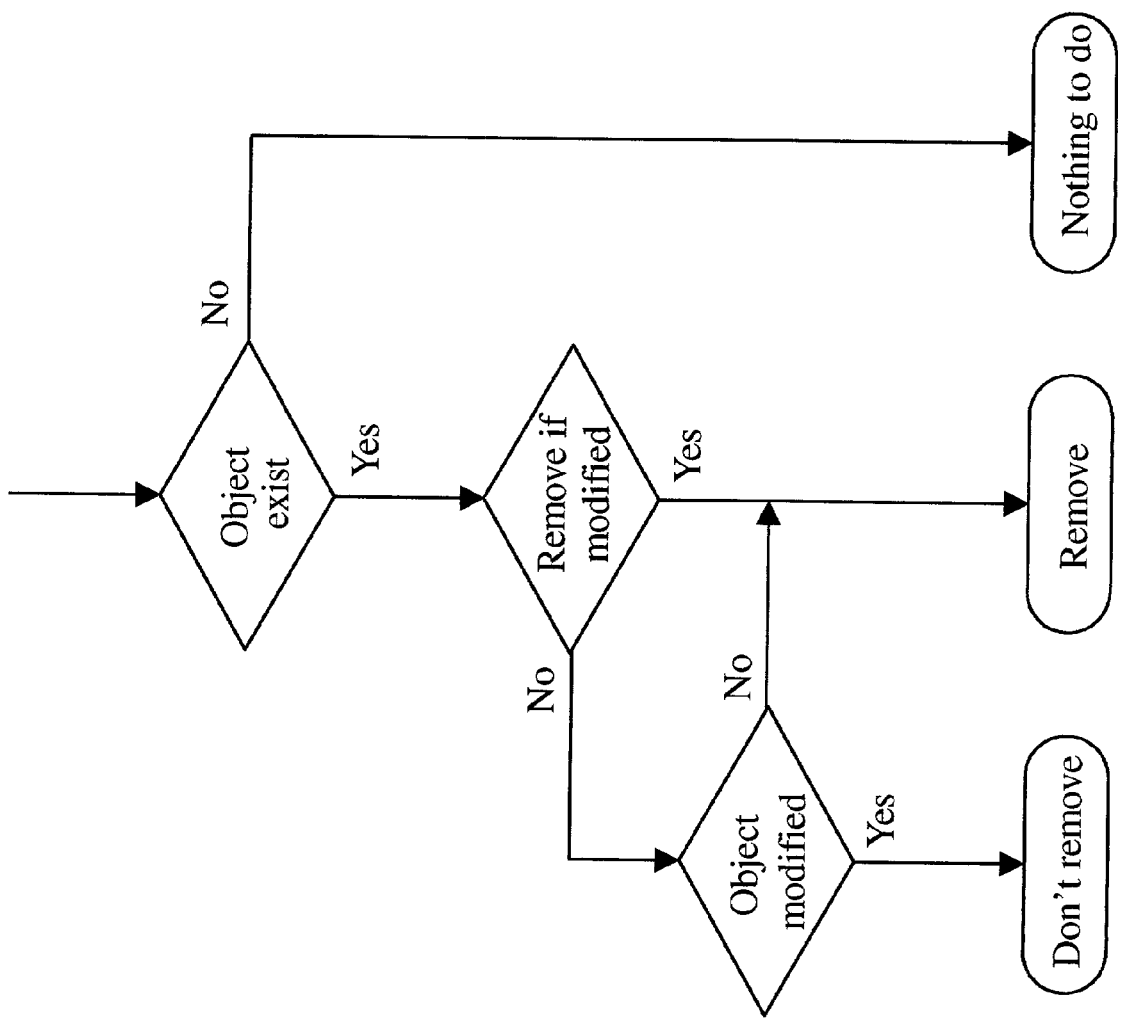
Figure 6:
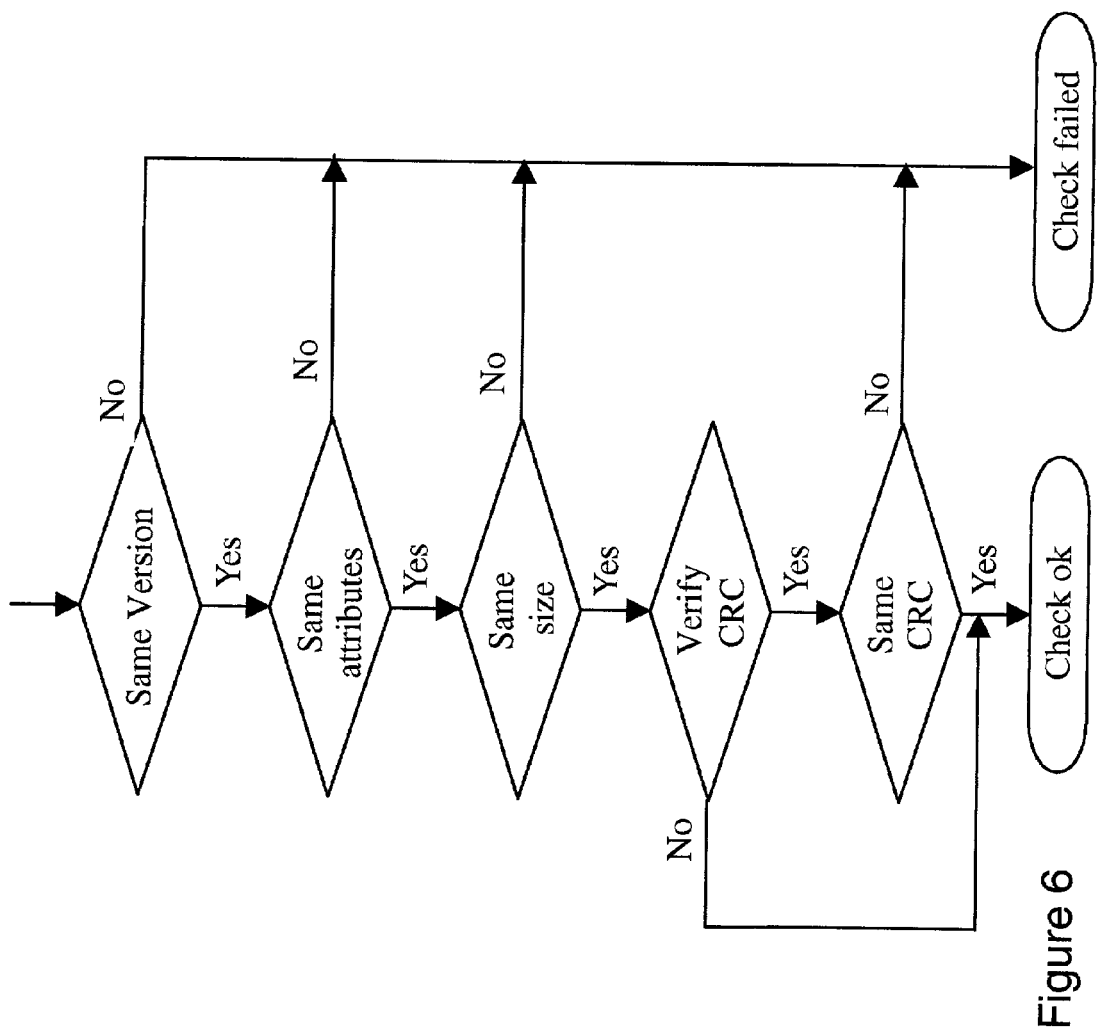

The AddObject Install and Remove algorithms are shown in FIGS. 4 and 5 respectively. In Microsoft Windows for example, it is the File Version that is managed, and in general, a file regarded as newer if: its version is newer; or its modification time is newer, if its Version is not specified. FIG. 6 shows the file identity check algorithm, where the operator may require a strong check by setting a verify_crc attribute on the file object.

InstallableObject on the other hand has one property is_shared, which takes into account that files can be shared among multiple software packages. In response to the is_shared attribute being set for a file, the SP Engine 18 associates a shared counter with a file to indicate how many software packages are using the file. The removal of a shared file decreases the shared counter and the file is physically removed when the shared counter becomes 0, that is, no more software packages are using it. (On Windows systems, the shared counter is mapped into the Windows Registry at: HKEY_LOCAL_MACHINE\Software\Windows\Current Version\Shared DLLs).

To illustrate the implications of shared files, take for example a situation where a software package sp^1.0 that contains the file c:\winnt\System32\MyApp.DLL is installed. Then a software package sp^2.0 that contains the file c:\winnt\System32\MyApp.DLL is installed as a shared object. The MyApp.DLL will not be removed during the removal of sp^1.0 from the system since there are software packages sharing it (sp^2.0). During the removal of sp^2.0, however, the MyApp.DLL will be removed from the system. So the sp^1.0 will not work properly since a vital file has been removed. So, it will be seen that without careful management, a software package that does not share an object could be damaged by the removal of software packages sharing that object.

In another example, suppose that the file c:\winnt\system32\msvcrt40.dll is in the SharedDLLs Registry Database. A software package sp^1.0 that contains the file c:\winnt\system32\msvcrt40.dll is then installed. During the removal of sp^1.0, the msvcrt40.dll file will not be removed because it is supposed to be used by other applications (in fact there is a related entry in the Registry key SharedDLLs).

Examples of built-in actions and installable objects are shown in FIG. 7, and these divide into:

Object related actions which as explained above add and remove installable objects to and from the target system;

System actions and Checks, for example, machine related actions such as, restart, or checks such as Check-DiskSpace; and Program actions, for example, to permit execution of custom programs or scripts during software distribution, for example, ExecuteMSSetupProgram, or ExecuteCIDProgram.

It should be seen that some of the actions shown in FIG. 7 are particular to operating systems such as Microsoft Windows 95/98/NT, variations of UNIX or OS/2 from IBM Corporation. Making such actions conditional, in these cases on the operating system of the target, enables a single software package to be made generic.

One tool used to prepare software packages is a Software Package Editor (SPEditor) 20, FIG. 1(b). The SPEditor enables an operator to graphically define the software package using an interface illustrated in FIG. 8. By default, the software package is the first action to be defined and the operator simply right-clicks on the icon for the package and is provided with a menu enabling the operator to enter, inter alia, the name and version attributes for the package. Further child actions are added from a menu of possible actions and their attributes are added though pop-up menus or dialogue boxes or other such user interface widgets until the software package is defined.

Figure 9A:
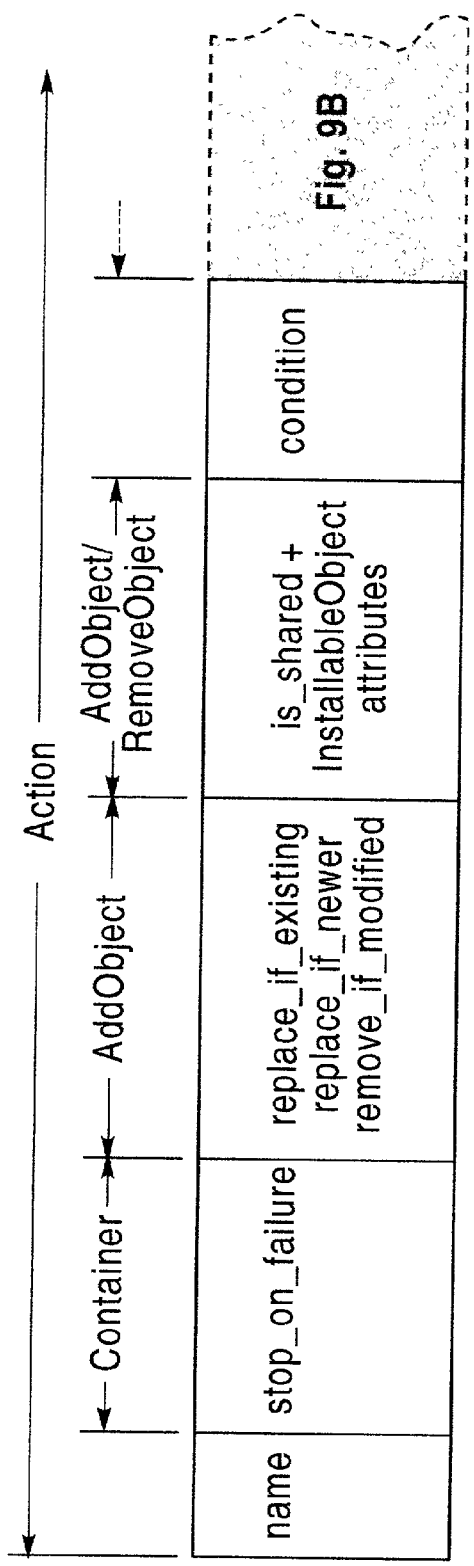
FIG. 9 illustrates the grammar of a software package.
Figure 9B:
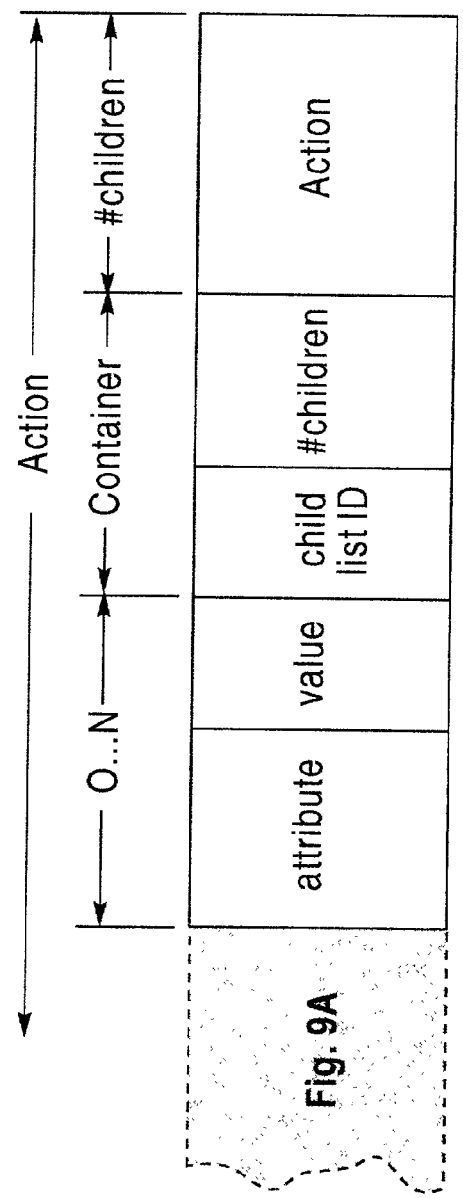

The software package itself is manifested in a number of formats:

A Software Package (SP) file which is an internal binary representation of the software package. This is the default format produced by the SPEditor. In the preferred embodiment, the hierarchical structure of the software package is serialised for writing to the SP file and vice versa by the SPEditor according to the grammar shown in FIG. 9. The SP file is broken into actions, with each action type given a unique name which corresponds with the name of a class extending Action. Each such class has, inter alia, an associated encode and decode method (these are the only methods of these classes of interest to SPEditor). It will be seen therefore that SPEditor can either include cut down versions of the Action classes, or for maintenance purposes a single Action class can be used, with its remaining functionality (to be explained later) ignored.

In any case, after a software package has been defined using the SPEditor, the SP file is generated by traversing the software package hierarchy in a top-down manner and calling the encode method for each action. On the other hand, when a SP file is being read, the name field is used to look up a table telling the processing program, in this case SPEditor, which class to instantiate, and once instantiated, its decode method is then called.

When called both the encode and decode methods first call the corresponding encode or decode methods of their parent classes. For Container classes, this means the parent class decode method will read the value for the stop_on_failure attribute from the SP file, advancing a SP file pointer to the end of the attribute value, and set the stop_on_failure attribute of the container in memory accordingly. On the other hand the parent class encode method takes the stop_on_failure attribute value in memory and writes this to the SP file, again advancing the SP file pointer.

For AddObject classes, the parent class decode method will read the value for the replace_if_existing, replace_if_newer and remove_if_modified attributes from the SP file, advancing the SP file pointer to the end of the attribute values, and set the corresponding attributes of the AddObject in memory accordingly. On the other hand the parent class encode method takes the replace_if_existing, replace_if_newer and remove_if_modified attribute values in memory and writes them to the SP file again advancing the file pointer.

For both AddObject and RemoveObject classes, the encode method calls the corresponding encode method of the Installableobject class they contain. The instance of the InstallableObject class, for example, File, first calls the encode method of its parent class Installableobject. This causes the (Boolean) value of the is_shared attribute to be written to the SP file, after which the instance of the InstallableObject class, in this case File, then writes out the attributes for the file including: source, destination and compression_method. In the case of decode, the containing class knows from its own name the type of Installableobject class that it needs to instantiate before calling the decode method on the instance of that class. (Alternatively the Installable object portion of the Action can itself contain an indicator of the class which should be instantiated to decode this portion of the SP file.) In any case, the decode method calls its parent class decode method which reads the is_shared attribute value before reading the remaining InstallableObject attributes in the SP file, setting the corresponding attributes of the Installableobject in memory and advancing the file pointer as before.

For all Actions, the parent class decode method reads a condition from the SP file, advancing a file pointer to the end of the condition, and sets the condition attribute of the action in memory accordingly. On the other hand the parent class encode method takes any condition attribute of an action in memory and writes this to the SP file, again advancing the file pointer. Again for all Actions, the encode method writes out a pre-determined set of attribute-value pairs according to the values either automatically set for an action, for example, defaults, or explicitly set by the SPEditor user. When instantiated the corresponding decode method knows how many attribute-value pairs to expect and preferably in which order they appear in the SP file. This enables the decode method to check the SP file hasn't been corrupted.

If the action is a Container, the encode method then writes a child list identifier and the number of children contained by the action to the SP file. The encode method then calls the encode methods of any child actions so recursing in a top-down manner through the hierarchy. On the other hand, the decode method knowing the action is a container expects to see a child list identifier and to read a number of children from the file. This tells the decode method that the next #children actions are contained by the present action. The decode method thus loops for the number of child actions instantiating a contained action class for each child. The decode methods are in turn eventually called on each of these child instances causing the hierarchy to be built up in memory in a top-down manner. It will therefore be seen that because each instance of a container class contains its child actions, it is possible to traverse the hierarchy in memory in a top-down manner carrying out desired actions on each class instance in the hierarchy.

At the bottom of the hierarchy are non-container actions (or container actions without children), and for these the encode or decode function simply returns once the attribute-value pairs are written or read, so allowing the recursion through the hierarchy to unwind and either for the encoded SP file to be written to disk or for further processing to be carried out on the decoded software package hierarchy in memory.

It can be seen that in fact the encode/decode methods for any particular Action class can be implemented freely so long as they complete by moving the file pointer to the end of the action in the SP file when being read or written, so enabling different aspects of the functionality of the software package to be developed independently of one another in a collaborative manner.

It should also be seen that, in particular, the decode process operates by reading the SP file serially, that is, without the need to randomly access the contents of the SP file. Where the SP file is available in local storage, this matters relatively little, however, as will be explained later, this aspect of the SP file architecture is particularly useful for reading the SP file through a serial connection such as a network socket.

Continuing with the different types of software package, a Software Package Definition (SPD) file is a text file used to describe a software package, FIG. 10. The SPD file can be used in place of the SPEditor and can be subsequently interpreted using conventional parsing techniques to generate a SP file and vice versa. Because the SPD file comprises plain text, rather than the binary SP file format, it can be manipulated easily and automatically by custom scripts, text editors, etc. to automate package definition tasks.

The SPD file syntax is based on a sequence of stanzas, with each stanza representing an action. Stanzas can be nested, with stanzas that contain other stanzas representing a container action. The top level stanza corresponds with the software package. (The contents of a stanza are couples: attribute, value). For the purposes of the present description, the SPD file format will be used to illustrate to functionality of the software package although it will be seen that it is analogous to the SP file.

Finally, a Software Package Block (SPB) file is a ZIP archive file containing a SP file and all files to be distributed in a software distribution. The SPB file is built by opening a new ZIP file, adding the SP file to the ZIP file, decoding the SP file, then traversing the software package hierarchy and calling a Build method on each of the Action classes. In general, only the Installableobjects contained by AddObject provide more than an abstract implementation of the Build method, and these go to the source specified in, for example the File or Directory class attributes, and add the file(s) and/or directory structure specified to the ZIP file. Typically, the source specified is located on a source host 40 which is a managed node within a TME.

Thus, any unzip tool can be used to view the contents of an SPB file. Also, using a single SPB file means that there is no need to collect files from the source host at the time of software distribution. If on the other hand only a SP file is available at the time of software distribution then files must be collected from the source host at the time of software distribution.

Figure 11:
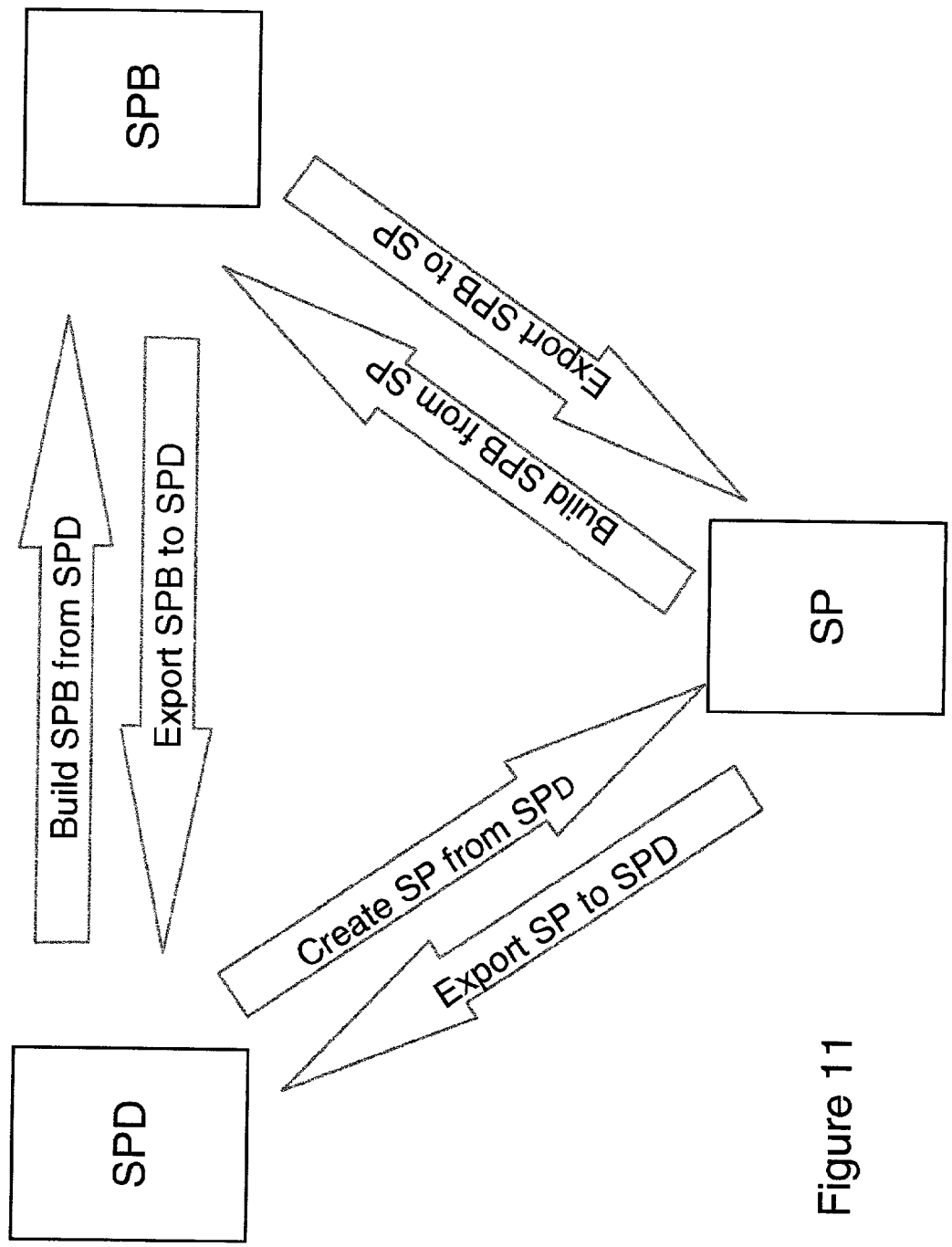
FIG. 11 illustrates the relationship between different manifestations of software package.

In any case, once a software package is available in any format, three programs 24 are provided on the preparation and test site 30 to transform a software package from one format to another, FIG. 11:
wdcrtsp.exe
   Creates a SP from a SPD; and
   Builds a SPB from a SPD
wdbldspb.exe
   Builds a SPB from a SP
wdexptsp.exe Exports a SPB to a SP or a SPD (The export does not extract files from the SPB)
   Exports a SP to a SPD It will be seen that using SPEditor to build a complete software package may require the addition of many individual actions which may prove laborious and error prone. One technique for quickly building a software package is a tool referred to as AutoPack 22, FIG. 1(*b*), which detects files and system configuration changes after the installation of an application. AutoPack then encodes changes in a Software Package ready to be distributed.

AutoPack operates by first running a first snapshot of a target system. The application to monitor is then installed on the system and a second snapshot of the system is then run. AutoPack then detects the differences between first and second snapshots to generate a software package.

Examples of platforms where AutoPack is particularly effective are Windows 95/98/NT; OS/2 3.x; and Unix with the type of components that are monitored during the installation being:
   File System
   Text Files
   Windows Registry
   Windows Profiles
   Windows Shell
   Windows NT Services
   OS/2 Profiles
   OS/2 Desktop
   OS/2 System Files (OS2.INI OS2SYS.INI)

For each component above, the user can specify what portion of the system is to be monitored, for example, monitor only the c: drive and portions of the Windows registry, eg. HKEY_LOCAL_MACHINE\SOFTWARE\Tivoli. Similarly, for each component above, the user can specify portions of the system to be ignored, for example, ignore changes under c:\temp directory.

Ideally, the system on which the application is installed should be a pristine workstation, and AutoPack should be run on the same operating system as the target machine.

Once the SP file is built, it can then be checked with the SPEditor to look for unwanted objects and to build in conditions. The corresponding SPB can then be built, however, it is advisable to test the SPB before making it available in the TME, for example, by running the SPB on a target disconnected from the TME.

It will be seen that a software package built using, for example, AutoPack will only be able to run in one manner. In order to make a Software Package flexible, the software package can also include variables which are particularly useful within conditions. Variables and conditions enable a software package to be created that can be installed on targets with different configurations or operating systems and as mentioned above make a software package generic so requiring less maintenance.

A variable is an association between a symbolic name and a value, for example, target_dir=c:/MyApp. A variable is referenced in the software package as a place-holder $(name) that is replaced by its value during the execution of a software distribution operation by the SP Engine 18. Any attribute's value of type string or pathname in the software package can contain references to variables. FIGS. 12(*a*) and 12(*b*) illustrate an extract from a software package where the attribute value of "destination" is replaced with a variable.

References to variables can be nested, for example:
   $(target_for_$(os_name)_$(os_release)) with the resolution process starting from the inner most variable, so that in the above case, the value of os_release is substituted to give, for example:
$(target_for_$(os_name)_4.10) and then the value of os_name is substituted to give, for example:
$(target_for_Windows_95_4.10) before the value of target_for_Windows_95_4.10 is substituted.

A variable's value can also contain references to other variables, for example, target_dir= $(program_files)/MyApp FIG. 12(c) shows how a software package can be made generic through the use of variables within conditions. Furthermore, variables and conditions also enable the customisation of individual data files distributed within the SPB file. As shown in FIGS. 13(a) and 13(b), the distributed text file MyApp.CFG, itself contains a number of variable place holders $(hostname), $(target_dir) and $(os_name). Within the SPD, the attribute substitute_variables is set to y to indicate, particularly during an install operation, to the File class instance associated with MyApp.Cfg that it should in turn parse MyApp.Cfg looking for variable names and substitute these for variable values within the processing program, for example, the SP Engine 18.

There are of course different sources of variables including:
  Command-line variables (supplied to the program operating on the software package);
  User-file variables (stored in a pre-determined file accessible to the operating program);
  Built-in variables;
  Environment variables;
  Hardware-discovered parameters; and
  Default variables;

and the order of resolution of variable values is from top to bottom of this list.

In the preferred embodiment, user-file variables are stored in a Swdis.ini file located in, for example:
  c:\windows\swdis.ini
  c:\os2\swdis.ini
  SYS:\SYSTEM\swdis.ini
  /etc../Tivoli/swdis.ini depending on the operating system.

Swdis.ini typically contains the following variables, here shown with typical values:
  product_dir=C:\tivoli\swdis
  working_dir=C:\tivoli\swdis\work
  backup_dir=C:\tivoli\swdis\backup
  staging_dir=tivoli\swdis\service
  trace_size=10000000
  trace_level=0
  user_file_variables=C:\tivoli\swdis\swdis.var In the preferred embodiment, the concept of per user Action is also supported in the context of the Windows NT operating system. Here the registry entry HKEY_CURRENT_USER and User Shell are managed as per user Actions, so that, in operation, Actions common to all users are performed and then any per user Actions are performed automatically when the user logs on to the workstation.

It will be seen that the preparation and test site helps an administrator in the task of software preparation by:
  Providing a large set of built-in Actions and Objects
  Grouping Actions/Objects in an easy to use software package format
  Providing a graphical interface (SPEditor) to interactively create software packages
  Providing tools (AutoPack) to automatically create software packages with a limited manual intervention
  Defining a text format for the software package (SPD) so that it can be manipulated automatically by custom scripts, text editors, etc.
  Defining a built format for the software package (SPB) so that it can be distributed without the need to collect individual files from the Source Host.

Figure 14:
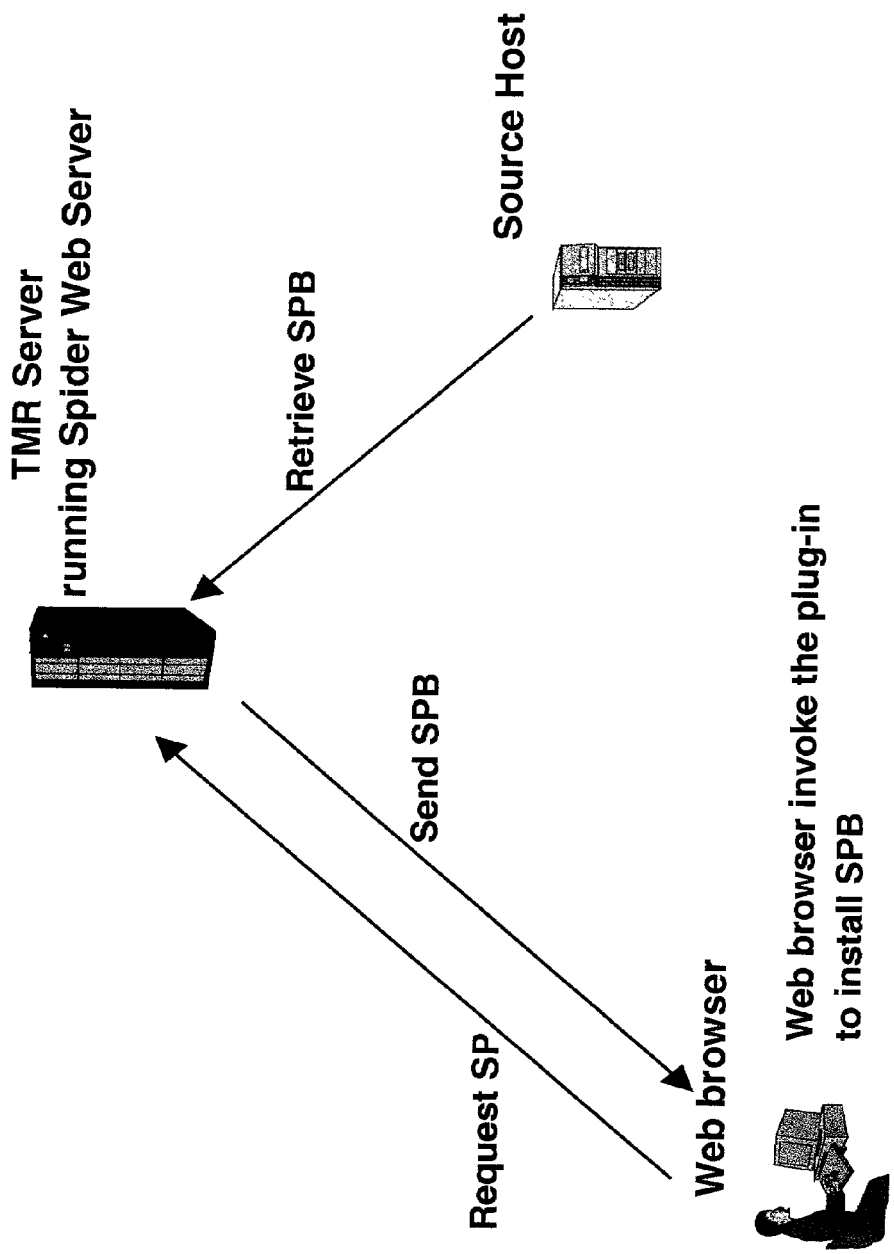
FIG. 14 illustrates the operation of a web style interface to the software distribution server.

Furthermore, the preparation and test site provides a disconnected command line interface to enable operators to test software packages before making them available across the network. Preferably, the disconnected command line interface takes the form of a web interface comprising a web browser plug-in to install or download a built SPB on a disconnected target, that is a target not within the TME, FIG. 14. The full set of disconnected command line commands are shown in FIG. 15, the first four have been explained above whereas the last six will be explained later. Using the web interface, a software package can be declared as: Hidden where it is not shown by the web interface; Subscriber, where only subscribers are allowed to download the software package; and Public where everybody can download the software package. Software packages can in turn be stored in two areas: Public, where no password is required (Only Profile Managers are owned by Public Policy Regions); and Restricted, where a Password is required (Both, public and restricted Policy Regions). In any case, both areas show Public and Subscribers software packages. The disconnected command line enables software packages to be managed (Build, Export, etc . . . ) and all the software distribution operations can be performed on the disconnected target. This is useful, particularly for testing software packages before distributing in a large environment.

Referring again to FIG. 1(b), once a software package has been built, planning and administration of software distribution activities is facilitated by importing the software package, in whatever format is available, into a Software-PackageObject (SPO), stored in an Object Database (not shown) in the TMR server 10. The TMR Server exposes a full set of administrative commands shown in FIG. 16 (The last six of these correspond with those of the disconnected command line and will be explained later). In any case, the SPO is treated as a conventional Tivoli Profile and resides in the context of a ProfileManager and through the SP file contains references to data being distributed. There are three states of an SPO:
  Empty: An SPO just created
  Built: An SPO built during the import
  Not-built: An SPO not built during the import The built format should be chosen if the user wishes to build an SPB immediately. When chosen, data is collected from the source host 40 during import. However, it should be noted that using this format, data are frozen, so all the subscribers receive the same copy of the data at any time. It should also be noted that if the user is importing from an SPB, then the built format should always be chosen.

The not built format should be chosen if the user wishes to build an SPB at distribution time. In this case, data are collected from the source host 40 when an installation is submitted. However, it should be noted that data may change on the source host; so subscribers may receive different data at different times.

Turning now to the actual delivery, in Tivoli V3.6, software is distributed using multiplexed distribution. In a TME, this is a service that enables efficient distribution of large amounts of data across complex networks. While the multiplexed distribution of Tivoli V3.6 is synchronous, in that any distribution operation relies on each target endpoint of the distribution operation to be connected within the TME before a distribution operation can complete, the present invention can operate with an asynchronous system, where the distribution operation takes place on each target endpoint whenever it connects to the TME, with an operator being able to monitor the status of a distribution operation using a Distribution ID as described in the related patent applications.

Asynchronous delivery enables the system to handle disconnected targets without requiring the operator to either wait for a target to re-connect; or to cancel a current distribution and possibly re-try when the target may be re-connected.

Figure 17:
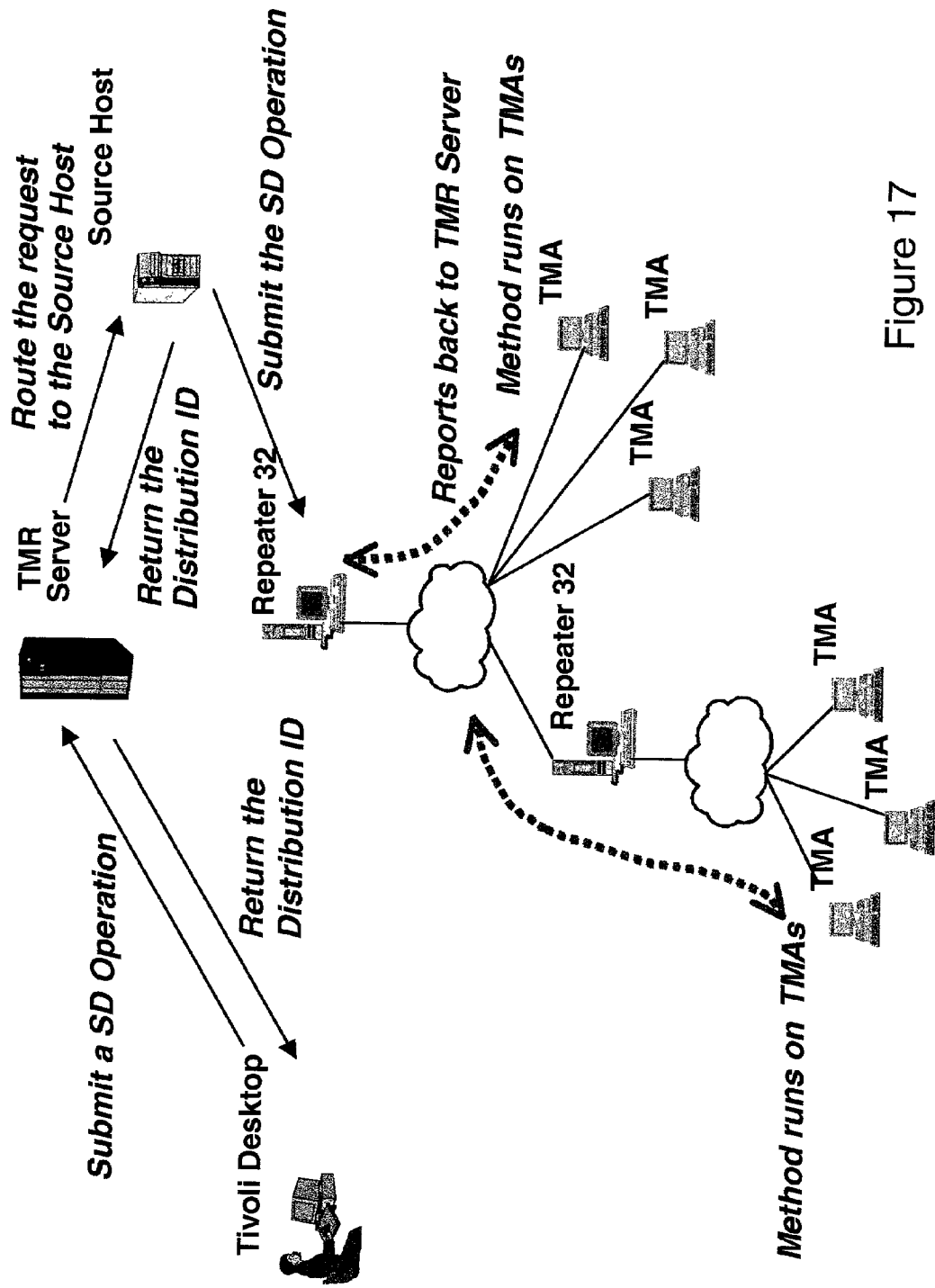
FIG. 17 shows a generic software distribution operation.

A generic software distribution is shown in FIG. 17. When an operator submits a software distribution operation to the TMR Server 10, the request is then routed to the source host 40. The source host 40 submits the software distribution operation and returns a Distribution ID to the server enabling the operator to monitor and control the software distribution operation through the Distribution ID or a distribution name which is a label given to the Software Package Object subject to distribution. Control commands include Pausing or Cancelling the distribution as well as enabling an operator to request detailed reports after a software distribution operation completes.

Figure 18:
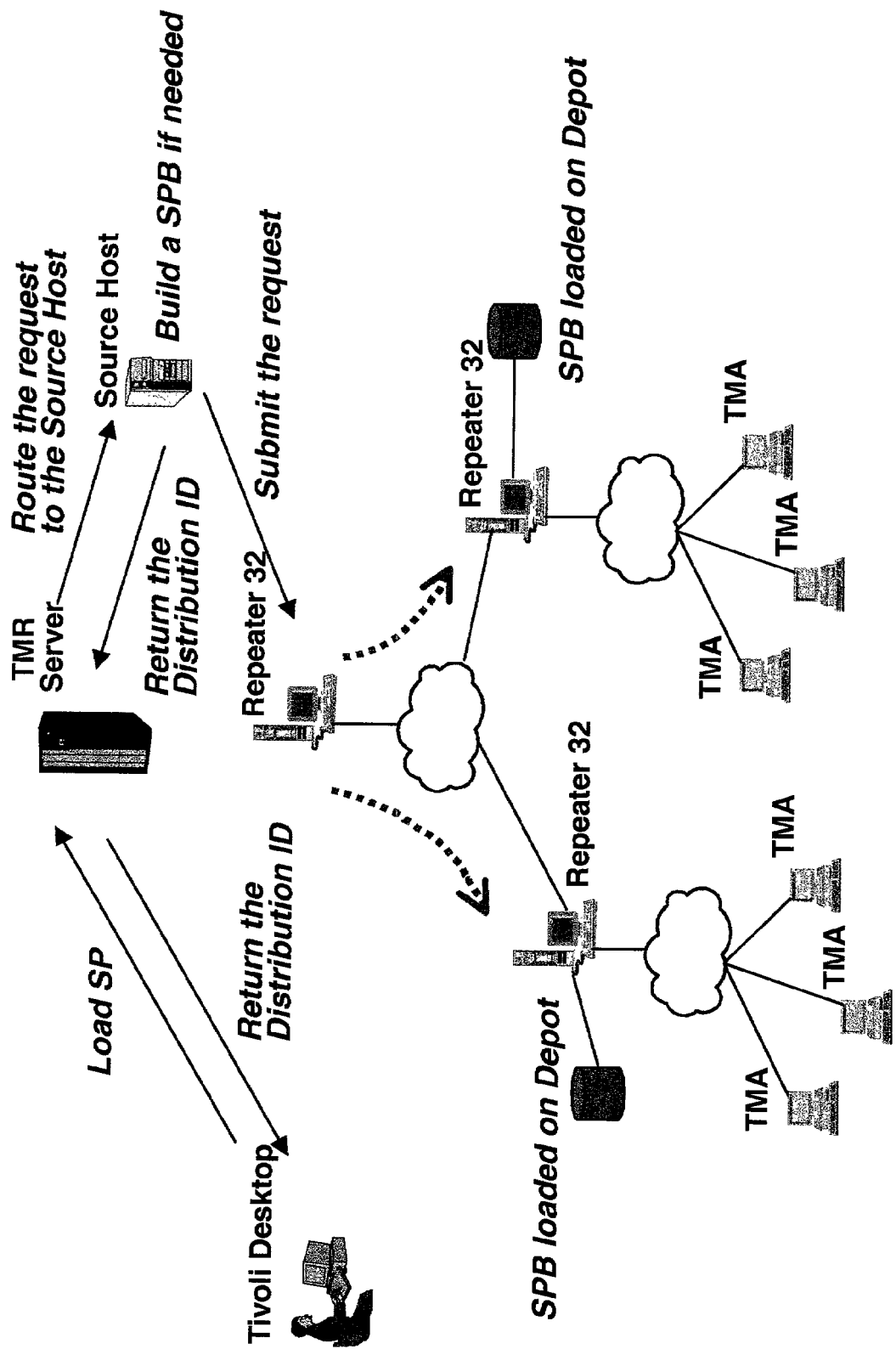
FIG. 18 illustrates the process for loading a software package onto a depot.

Software distribution takes place across a hierarchy of repeaters 32 before reaching workstations. Repeaters 32 within the hierarchy are referred to as depots and software packages may be loaded and stored on the depots, FIG. 18, through two programs on the TMR server:

wldsp.exe for loading a SP on one or more Depots
wuldsp.exe for unloading a SP from one or more Depots.

Thus, for each software distribution operation, the SP Engine is provided with a software package label name, and then opens a communications channel to its nearest gateway/depot 32. (The target thus receives data directly from the last depot in the distribution hierarchy whenever it connects rather than needing to be connected within the TME for a software distribution operation to take effect.) The label corresponding to a SPB file enables the SP Engine to set up a file buffer and begin reading the SPB file. The first file of the SPB file is in fact an SP file, and this can be simultaneously read and decoded to create the software package hierarchy in target system memory for the software package. (Alternatively, the SP file can be completely read into the file buffer, optionally written to the target system storage and then decoded). In any case, once the software package hierarchy has been read and is in memory, the SPB file pointer lies at the end of the SP file and at the beginning of the first file required by any action within software package hierarchy.

Figure 8:
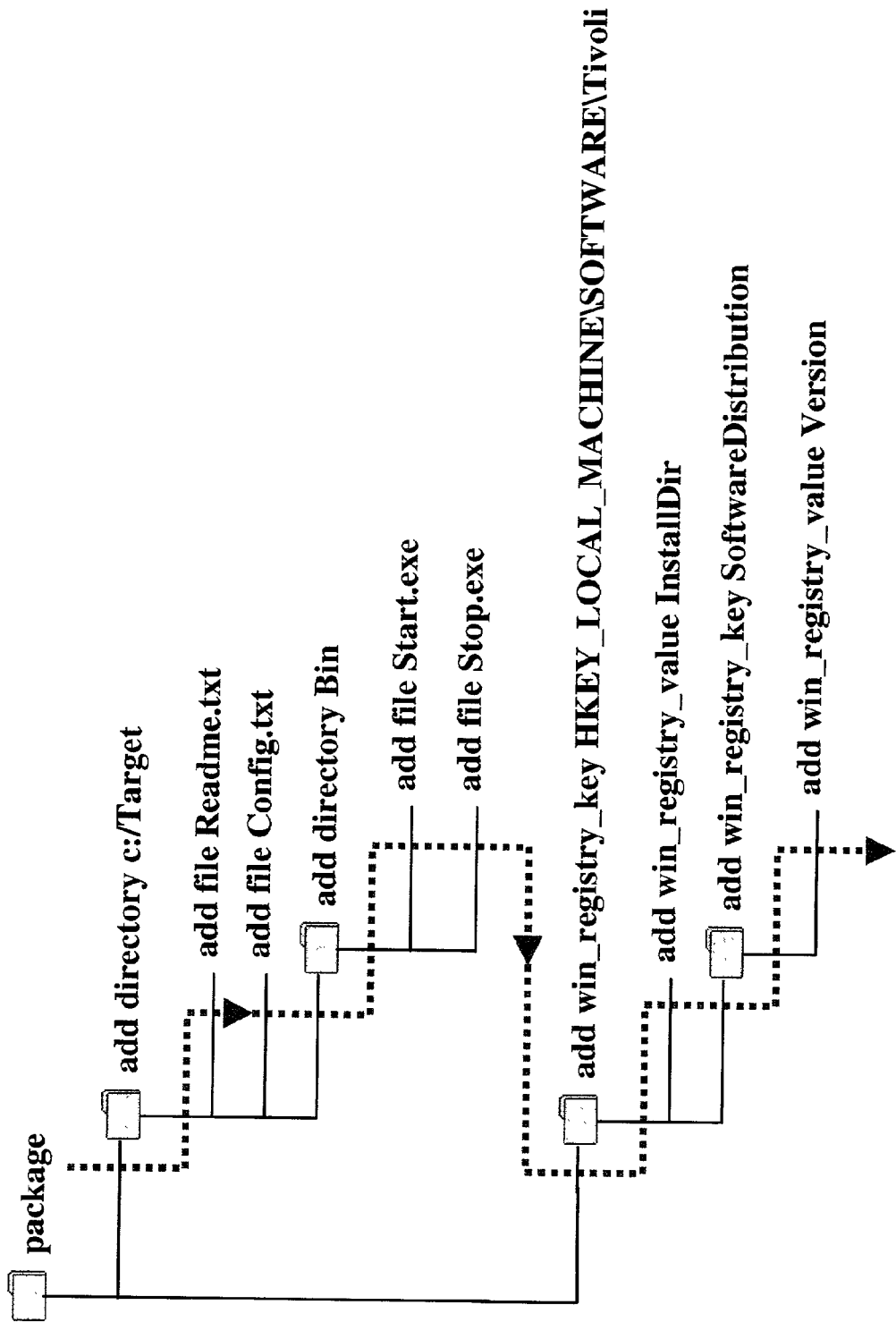
FIG. 8 shows a more detailed example of a software package and top-down parsing of the software package.

For each software distribution operation which is to be performed on a target machine, the SP Engine 18 reads and traverses the software package hierarchy as shown by the path of FIG. 8. In the preferred embodiment, each Action of the software package hierarchy exposes two methods: can_execute(operation, phase) and do_execute(operation, phase), explained in more detail later. The SP Engine need only call either the can_execute or do_execute method, with operation and phase parameters on the instance of software package at the top of the hierarchy. This in turn calls the same methods on its children causing the hierarchy to be traversed from the top down as explained above.

In the case of instances of InstallableObject contained by AddObjects, depending on the operation and phase, these will in turn need to read an associated file or directory from the SPB file buffer. (As explained above, the Build method for the Installableobject will have added its associated file or directory to the SPB file in the same sequence.) When the file has been read, the InstallableObject method writes the pointer offset within the SPB file buffer as well as its own identity to target system storage as a checkpoint.

Figure 21:
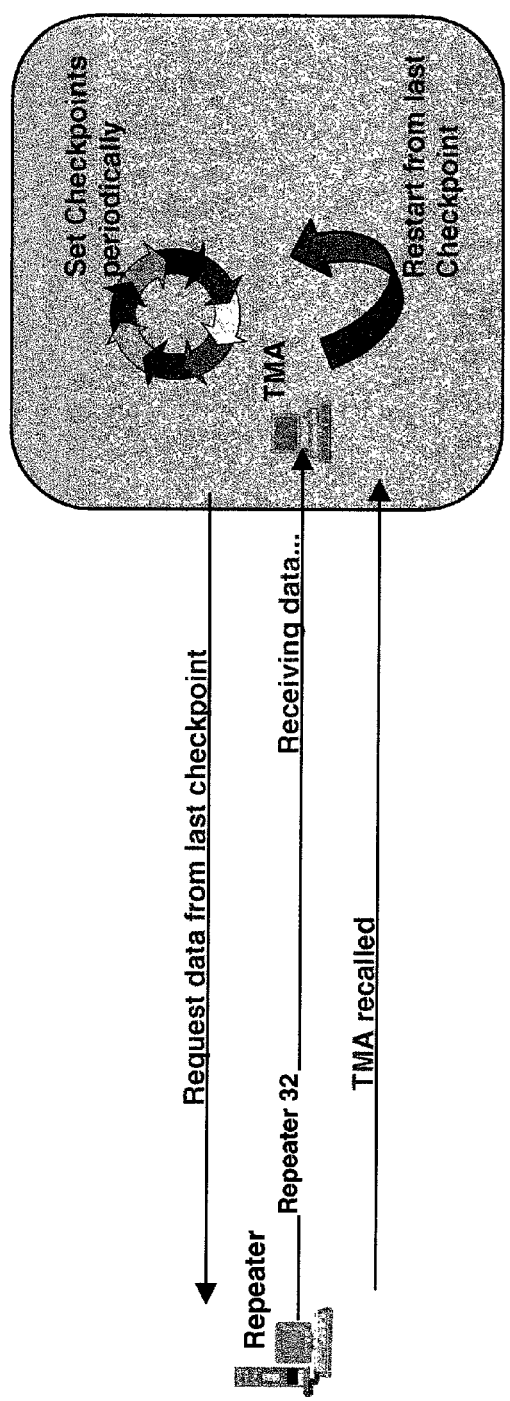
FIG. 21 illustrates the use of checkpoints in a software distribution.

This means that any software distribution is able to restart after interruption by power failure, network failure or reboot of the target machine through a Checkpoint-Restart mechanism. After a failure or reboot the software distribution operation is automatically re-submitted with the SP Engine 18 requesting data from the last checkpoint enabling the distribution operation to re-start, FIG. 21.

Figure 22:
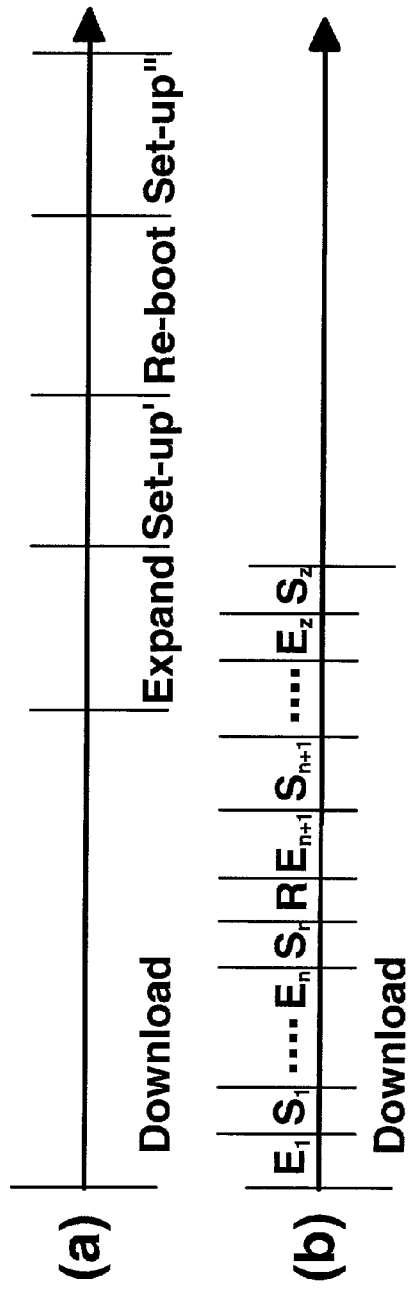
FIG. 22 shows timelines (a) and (b) illustrating the time saving for using checkpoints in software distribution.

This is a particularly useful feature where one of the actions required to install a software package is a re-start. Referring now to FIG. 22, in a conventional system, where for example a ZIP file or other archive file is downloaded, expanded and then a set-up program including a re-start is run to install the software, each phase must run in series as indicated by the time line (A). During the download phase, processing power is typically wasted while waiting for the archive file to download. The archive file is not decompressed until it is completely downloaded and processing of the file is held-up, because rebooting in the middle of a download would cause the download to fail and the file would need to be downloaded from the beginning again. Using the present embodiment, however, each action can execute its own processing on-the-fly as the SPB file is being downloaded. If an action requires a re-start, the target system can be rebooted under the control of that action. Once rebooted, the target system automatically returns to the processing of the SPB file. (This can be done by amending, for example, the Autoexec.bat or other similar file, to call the SP Engine 18 with the same parameters it was operating under when the target system rebooted or through instructing the SP Engine via the TMA.) The SP Engine rereads the SP file, so setting up the software package hierarchy, reads the saved checkpoint and then traverses the hierarchy as before. Each action examines the checkpoint to determine if it was the action last in control of the operation. Once this last action reads the checkpoint, it sets the SPB file buffer pointer to the offset recorded in the checkpoint, continues with its processing and returns, enabling the next action to begin processing. The timeline (B) for this software distribution operation, shows that the expand, reboot, set-up of the prior art has been replaced by individual expand, set-up activities 1 . . . z, corresponding to actions within the tree, carried out in parallel with the downloading of the SPB file and thus reducing the overall time required to install a package.

Referring to FIGS. 15 & 16, the final six commands relate to the actual performance of software distribution operations and provide an extended set of software distribution operations for controlling a software package's life-cycle, including:

Install; Remove; Verify; Commit; Rollback[1]; Undo; Accept

In the preferred embodiment, Rollback is not provided as an explicit administrator command, FIGS. 15 & 16, as it is preferably performed automatically if a transactional software distribution operation fails.

The basic software distribution operations are: Install, Remove and Verify.

As well as basic mode, these operations can also be performed in the following modes of execution: Transactional; Undoable; Undoable in Transactional; and Transactional and Undoable. These modes of execution implicitly introduce the additional operations mentioned above: Commit and Rollback for Transactional modes; and Undo and Accept for Undoable modes. A summary of the operations and their associated modes of operation is shown in FIG. 19.

Thus, the Install and Remove programs: wdinstsp, wdrmvsp, winstsp, wremovsp; and to an extent the Undo programs: wdundosp and wundosp, which may or may run in transactional mode, FIGS. 15 & 16, are called by an administrator using switches to in turn indicate during a software distribution operation to the SP Engine 18 running on the target, in which mode it should run and what it should do with the actions of the software package hierarchy.

As mentioned above, each Action of the software package hierarchy exposes two methods: can_execute(operation, phase) and do_execute(operation, phase), where operation includes:

Execute;
Reverse;
Verify_Execute; and
Verify_Reverse and where phase includes:
Do;
Prepare;
Commit;
Commit_before_reboot;
Commit_after_reboot;
Accept;
Do_Cleanup;
Prepare_Cleanup;
Commit_Cleanup; and
Accept_Cleanup The SP Engine performs the Execute and Reverse operations in three steps:

Check: Test that the operation can be performed, thus reducing the risk of failure during the next Execution phase by calling can_execute(operation, phase) on the actions of the software package hierarchy;
Execute: Perform the operation only if it passes the check by calling do_execute(operation, phase) on the actions of the software package hierarchy; Cleanup: Releases resources eventually acquired during the Execution phase by calling do_execute(operation, phase_cleanup) on the actions of the software package hierarchy.

Thus, it will be seen that each class instantiated for an Action in the software package hierarchy can implement up to 32 concrete methods: for each operation (Execute, Reverse), for the phases of each mode in which the operation can run (Do, Prepare, Commit, Accept) both basic and _Cleanup, and for each step (Check, Execute).

In addition, in the case of the Verify_xxx operations, while there is no need to provide for check or cleanup methods to be implemented as the SP Engine preferably only calls do_execute(Verify_xxx, phase), up to 8 methods can be implemented for when phase is one of Do, Prepare, Accept and Commit to verify the state of a software package.

In relation to removing a software package from a previously installed target machine, the program traverses the Software Package reversing each action performed by an install. Remove applies only to Object Related Actions (add_xxx), that is the reverse of an add_xxx action performs the remove_xxx action. However, in general the reverse of a remove_xxx action does nothing. (For System and Program Actions, it can be specified what to do during the Remove.)

It should be noted that if either an Install or Remove operation fails the target system may be in an inconsistent state and for this reason, in the preferred embodiment, a transactional mode of operation is provided. This comprises a two phase operation:

Prepare where each action prepares the conditions for a successful execution. (Files and directories are copied to a temporary staging area);
Commit where each action executes the operation causing updates to take effect. (Files and directories are moved from the temporary staging area to final destinations); or
Rollback where the operation is cancelled. (All preparation actions are undone).

In the preferred embodiment, if something goes wrong during the prepare phase, rollback is carried out automatically. It is also preferable to run the commit phase during a reboot to reduce the risk of failure because of resources in use and for this reason further methods are provided to implement the Commit_before_reboot and Commit_after_reboot phases.

Transactional operations are best used to manage locked files with the update of locked files being scheduled during the next reboot. In any case, if all Actions can be performed, the software distribution operation is committed. However, if there are files in use, the software distribution operation is committed during the next reboot and the operator can chose to automatically reboot the machine or not by setting the appropriate attributes of the Action in the software package.

Figure 23:
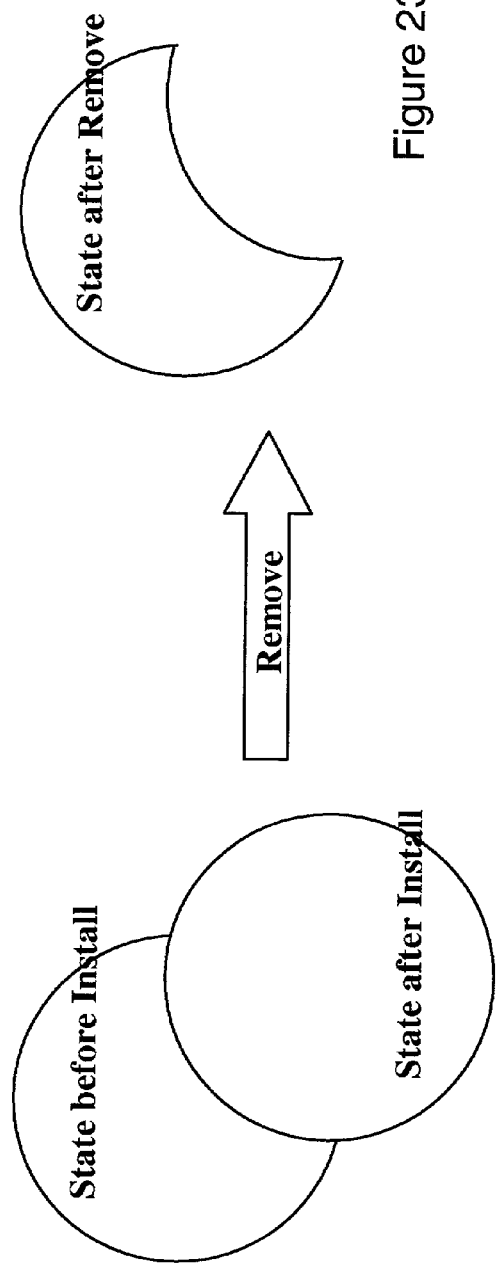
FIGS. 23 and 24 illustrate the difference between removing and undoing the installation of a software package.

Also, as illustrated in FIG. 23, remove is not safe. This is because if, for example, a file existing on a target system is replaced in a software distribution operation, the simple removal of that file during a remove will leave the machine in an inconsistent state. Thus, in the preferred embodiment, both Install and Remove operations can also be performed in undoable mode. This comprises a two step operation:

Create a backup software package;
Install/Remove the original software package.

Figure 24:
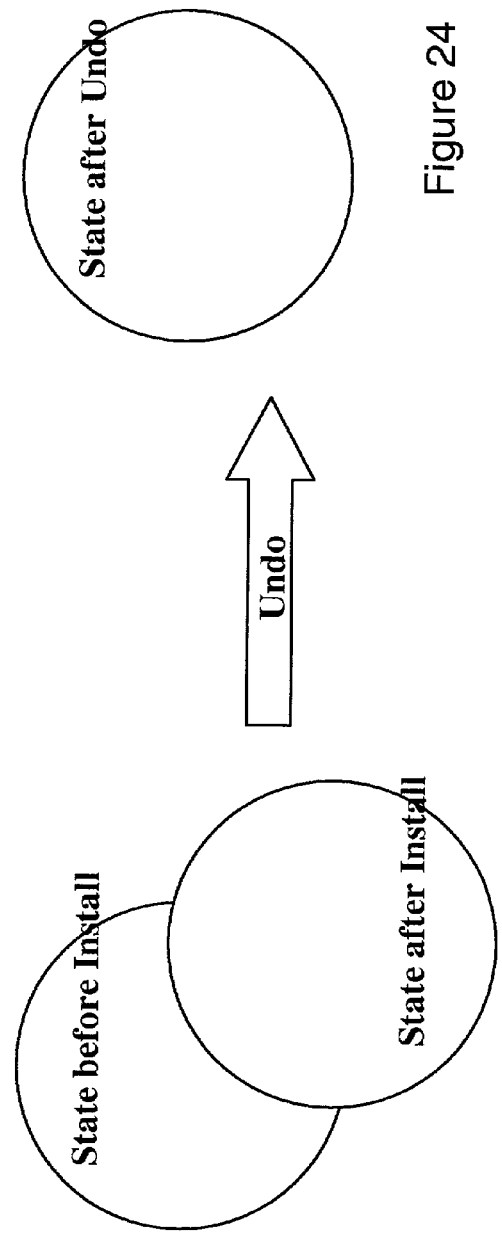

The creation of a backup software package in Undo mode gives the possibility of restoring the previous state of the system by simply installing the backup software package—that is running do_execute(Execute, Do) on the backup software package. The Accept command causes the backup software package to be deleted in order to free target system storage, as Undoable mode requires additional disk space to save the backup package, FIG. 24. (In a preferred embodiment, the SP Engine 18 can be set to relinquish this extra disk space either: by accepting the software distribution operation automatically; or on demand where the operator calls wdacptsp or waccptsp.) Nonetheless, as also illustrated in FIG. 24, undoable operations are safe.

In undoable and transactional mode, a backup software package is prepared during the preparation phase of a transactional operation. In undoable in transactional mode, a backup software package is prepared in transactional mode, with the backup software package being obtained during the commit phase. This may be necessary because of resource locking even in read mode. Again, rollback should be executed automatically if something goes wrong during the prepare phase.

The final basic command, Verify, checks that changes done by the last operation on a software package are still in place. If some of the Actions are in error the software package is set in error and the user is notified of the list of Actions that failed.

It should be noted that not all the operations can be performed on a software package during the various states of its life-cycle. Thus, in the preferred embodiment, the state of a software package is represented by a string of 5 characters, FIG. 20. The software package State is composed of: the last operation performed (Install or Remove); the state of that operation (Prepared or Committed); the state of the backup package (undoable state); if reboot is needed to complete the operation; and an additional flag to indicate any error condition.

Figure 25D:
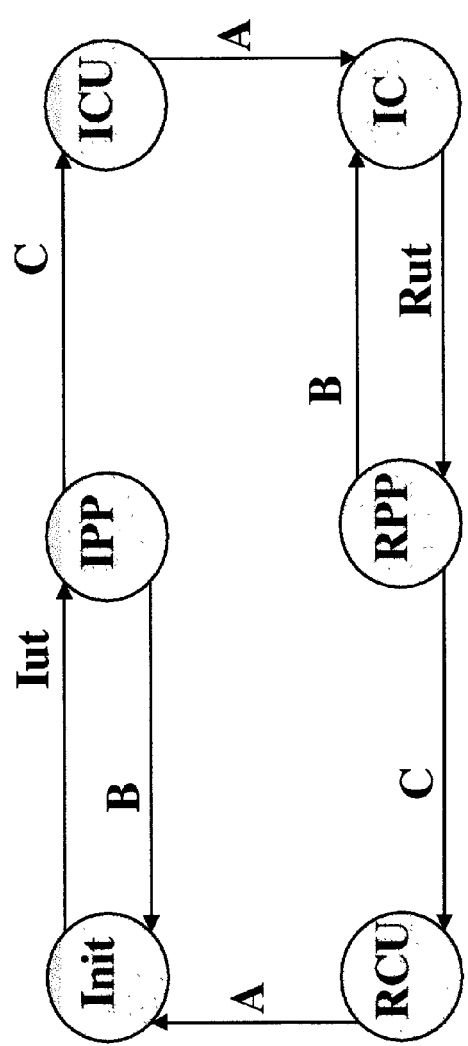

Now referring to the FIGS. 25(a) to 25(e), the state for each software distribution in each of its phases is illustrated. (Before Installing, the software package is indicated as being stateless-Init). The basic install/remove cycle is shown in FIG. 25(a). This comprises the steps:

Install (I)
    winstsp @SPlabel subscribers . . .
    wdinstsp SPB-file
Remove (R)
    wremovsp @SP-label subscribers . . .
    wdrmvsp SPlabel Here the install and remove programs of FIGS. 15 & 16 are called without transactional or undoable switches. These in turn instruct the SP Engine on the target(s) of the software distribution to first call can_execute(Execute, Do) on the software package, if successful, to call do_execute(Execute, Do), optionally can_execute(Execute, Do_Cleanup) and finally do_execute(Execute, Do_Cleanup) on the software package. To remove the software package, the SP Engine is caused to call can_execute(Reverse, Do) and do_execute (Reverse, Do) as well as the _Cleanup phase on the software package. The SP Engine knows a remove can be carried out for the software package because its state after the Install indicates that it is both Installed and Committed. If for example, Install had been run in transactional mode without Committing, Remove would not be allowed ab initio without traversing the software package hierarchy.

The transactional cycle is shown in FIG. 25(b), this comprises the steps:

Install-transactional (It)
    winstsp -ty @SPlabel subscribers . . .
    wdinstsp -ty SPB-file
Rollback (B)
    wundosp @SPlabel subscribers . . .
    wdundosp SPlabel
Commit (C)
    wcommtsp @SPlabel subscribers . . .
    wdcmtsp SPlabel
Remove-transactional (Rt)
    wremovsp -ty @SP-label subscribers . . .
    wdrmvsp -ty SPlabel Here the Install and Remove programs are called using the transactional switch -ty. These in turn instruct the SP Engine on the target(s) of the software distribution to first call can_execute(Execute, Prepare) on the software package, if successful, to call do_execute(Execute, Prepare), optionally can_execute(Execute, Prepare_Cleanup) and then do_execute(Execute, Prepare_Cleanup) on the software package. During the execution step of this phase, each AddObject action copies, for example, its associated file or directory to be installed to a staging area on the target system. At the same time a backup package is also built by each action. This entails each action of the software package hierarchy instantiating a new corresponding Action in a second backup software package hierarchy and setting its attributes appropriately. Thus, when the first hierarchy has been traversed, the SP Engine only has to call the encode method on the software package action at the top of the backup hierarchy to generate a backup SP file and then call the build method on the backup software package hierarchy to generate the complete SPB file for rolling back the preparation phase.

If installation fails or if for some other reason, the administrator decides to rollback the installation, the Rollback phase causes the Undo program to be called. This in turn instructs the SP Engine to call can_execute(Execute, Do) and do_execute(Execute, Do) as well as the _Cleanup phase on the backup software package. This will simply result in the deletion of the information stored in the staging area, returning the state of the software package (and the target system) to Init.

If on the other hand the administrator decides to Commit the distribution, then can_execute(Execute, Commit) and do_execute (Execute, Commit) and the _Cleanup phase methods are called on the actions of the software package hierarchy. Commit causes the files and directories to be moved to their final destinations on the target(s) and for system actions and program actions to be executed. In this case, it will be seen that the backup package built during the prepare phase will not enable the package to be undone successfully and so this is deleted and the state of the package is IC. Removal of the package of carried out in an analogous manner in that the remove programs are called with transactional switches -ty. The SP Engine calls the actions of the software package hierarchy with Reverse, Prepare parameters. Again a backup software package is built during this phase, so that if Rollback is invoked on the Remove, the backup software package can be Installed to bring the package back to the IC state. If the Remove is to be committed, then the SP Engine calls the actions of the software package hierarchy with Reverse, Commit parameters.

In both the case of install and remove, the can_execute method can be called using a Commit_before_reboot phase parameter to test whether or not commit can be carried out without needing a reboot, so speeding up an operation. If so, the execute methods can be called using the Commit_before_reboot phase parameter, and if not the execute methods can be called using the Commit_after_reboot phase parameter, knowing that reboot will be required.

In some cases, an operator may prefer not to operate in transactional mode, but may not know whether or not this is possible. In the preferred embodiment, a preferably-not-transactional option can used with the install or remove programs, if the operator is not sure about which files may in use during an operation but prefers to install or remove in basic mode. Thus, if the can_execute(xxx, Do) phase, where xxx is Execute or Reverse, of an operation fails and the preferably-not-transactional option is used, the SP Engine then tries a can_execute(xxx, Prepare) to begin the operation in transactional mode. If preparation succeeds, then knowing there is a good chance of files being locked, the commit phase is best performed after reboot. Thus, the commit phase comprises calling can_execute(xxx, Commit_after_reboot), do_execute(xxx, Commit_after_reboot) and the can execute(xxx, Commit_Cleanup). Here, it should be noted that the is only one Commit_Cleanup phase as it makes no difference during cleanup whether committal has taken place before or after reboot.

The undoable cycle is shown in FIG. 25(c), this comprises the steps:

Install-undoable (Iu)
    winstsp -uy @SPlabel subscribers . . .
    wdinstsp -uy SPB-file Undo (U)
    wundosp @SPlabel subscribers . . .
    wdundosp SPlabel
Accept (A)
    wacceptsp @SPlabel subscribers . . .
    wdacptsp SPlabel
Remove-undoable (Ru)
    wremovsp -uy @SP-label subscribers . . .
    wdrmvsp -uy SPlabel During the Install phase, actions are actually performed on the target(s), but at the same time a backup software package is built including all of the files needed by the actions of the backup software package to restore the target to the Init state. (This option is recommended for software packages that install system files, because the operation can be undone without damaging the target system.) The SP Engine sets a global Undoable parameter so that, during the Install operation, while the SP Engine again calls can_execute(Execute, Do), do_execute(Execute, Do) as well as the _Cleanup phase methods on the software package hierarchy, each of the Action implementing methods within the hierarchy detects that not only should they carry out the install action, but that they should also take the necessary steps in building their component of the backup software package required for carrying out an Undo operation. This entails each action of the software package hierarchy instantiating a new corresponding Action in a second backup software package hierarchy and setting its attributes appropriately. In the case of a backup package for undo, in particular, this may include making temporary copies of files and directories that will be overwritten or deleted during the install and setting the temporary file or directory locations as the source for the Actions of the backup software package hierarchy. Thus, when the first hierarchy has been traversed, the SP Engine only has to call the encode method on the software package action at the top of the backup hierarchy to generate a backup SP file and then call the build method on the backup software package hierarchy to generate the complete SPB file for undoing the installation.

The Undo programs then simply instruct the SP Engine to install the backup software package using Execute and Do parameters, while the Accept operation simply entails deleting the backup software package and changing the state of the original software package to IC. It can also be seen that Remove can also be carried out in an Undoable mode in an analogous manner. Again the methods implementing the can_execute(Reverse, Do) and do_execute(Reverse, Do) detect the Undoable parameter and understand that they should also take the necessary steps in building their component of the backup software package required for carrying out an Undo operation for the Remove phase In some cases, an operator may prefer to operate in undo mode, but may not know whether or not this is possible. In the preferred embodiment, a preferably-undoable option can used with the install or remove programs. (The main reason for undo not being possible is that there may not be enough disk space to store the backup package.) Thus, if the can_execute method indicates that it is not possible to complete the operation in undo mode, the Undoable parameter is simply reset, and the operation is conducting without the possibility of being undone.

The final two modes are undoable-in-transactional and transactional & undoable. These differ in that the undoable switches supplied to the Install and Remove programs are -uu and -uy respectively. The undoable-in-transactional cycle is shown in FIG. 25(d), this comprises the steps:

Install-undoable-in-transactional (Iut)
        winstsp -ty -uu @SPlabel subscribers . . .
        wdinstsp -ty -uu SPB-file
    Remove-undoable-in-transactional (Rut)
        wremovsp -ty -uu @SP-label subscribers . . .
        wdrmvsp -ty -uu SPlabel as well as the Rollback (B) and Commit (C) steps as before.

In this case, during the Install (Iut) phase, the Action methods implementing the can_execute(Do, Prepare) and do_execute(Do, Prepare) phase operate as in transactional mode preparing a first backup software package enabling the Undo program to Rollback the install preparation phase, by deleting the software package files stored in the staging area. (Again, rollback should be executed automatically if something goes wrong during the prepare phase.) However, can execute(Do, Commit) and do execute(Do, Commit) detect that the Undoable (in transactional) parameter is set and so take the necessary steps in building their component of a second backup software package required for carrying out an Undo operation on the Installed and Committed package. This includes adding an appropriate action to the software package hierarchy, but also, for example, amending Autoexec.bat to add the necessary files to the second backup software package during reboot. This means that the original software package is only undoable after it has been committed and only after reboot, which may be necessary because of resource locking even in read mode. Remove operates mutatis mutandis.

Figure 25E:
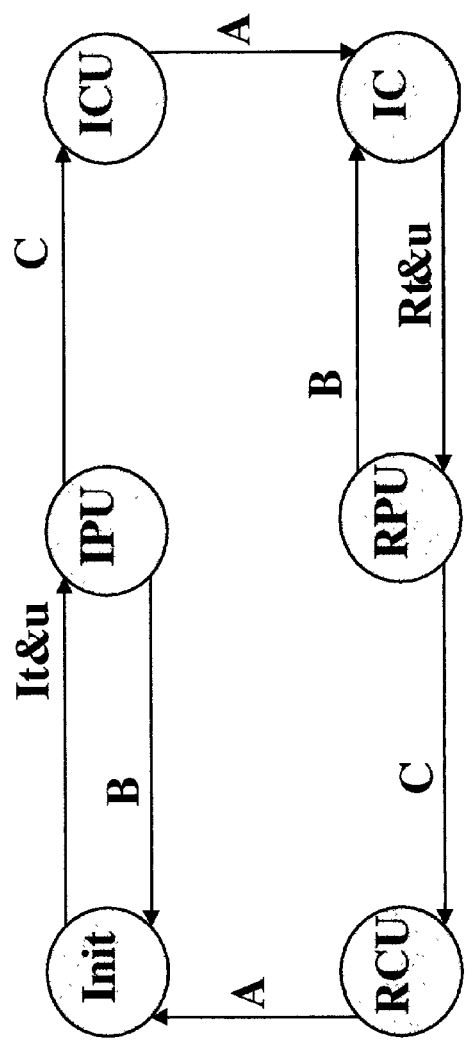

The transactional & undoable cycle is shown in FIG. 25(e) comprises the steps:

Install-transactional&undoable (Iut)
        winstsp -ty -uy @SPlabel subscribers . . .
        wdinstsp -ty -uy SPB-file
    Remove-undoable &undoable (Rut)
        wremovsp -ty -uy @SP-label subscribers . . .
        wdrmvsp -ty -uy SPlabel as well as the Rollback (B) and Commit (C) steps as before.

In this case, the first and second backup software package referred to in relation to FIG. 25(d) are created during the do_execute(Execute, Prepare) phase. Both Undo or Rollback on the installation can be performed at this state, using the first backup software package, but nonetheless amount to the same thing bringing the software package back to the Init state. After committing installation of the package, it still remains Undoable as before by installing the second backup software package.

The core operations and modes of operations of the software distribution system have been described above. It will be seen, however, that using the structures described above other functionality can also be provided.

Figure 26:
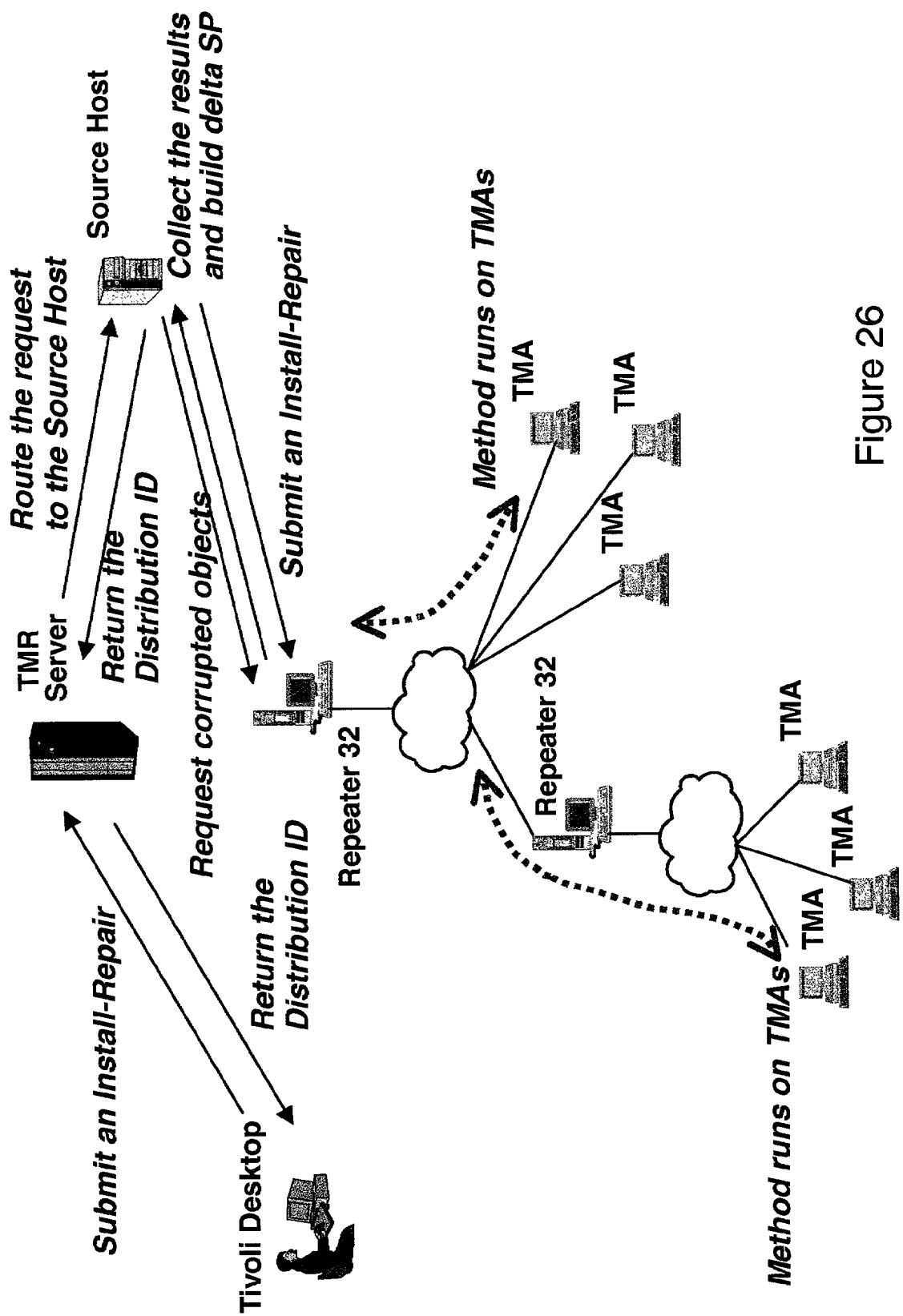
FIG. 26 illustrates the process for installing a software package in repair mode.

In a further aspect of the embodiment, an administrator can request that software be installed in repair mode, FIG. 26, with the goal of distributing only Objects that have been modified on the target machine since the last distribution. In this case a Not-Built software package is distributed to target machines where the software package has already been installed and committed. (This saves on network bandwidth usage).

The source host then requests the targets for all their Objects that must be repaired and this is done by traversing the software package hierarchy of the Not Built Software Package with the do_execute(Verify_execute, Do), and having methods on each action verify the state of the object they installed according to the algorithm of FIG. 6. Each check that fails is added to a list of objects to be repaired in a journal file which is then returned from the target. The Source Host then merges all the Objects together building a 'delta' software package with the 'delta' software package being installed with a Repair option on the winstsp or wdinstsp program.

When in turn launched with the repair option, the SP Engine sets a corresponding parameter. The do_execute (Execute, phase) implementing methods (where phase is one of Do or Commit depending on whether or not transactionality is used) for each action of the delta software package detect that the repair parameter is set and so install source objects that have changed on the target or that are not present on the target, in order to make the target objects consistent with the source objects.

The repair functionality reduces network congestion by identifying which source and targets objects have been modified or corrupted since the last successful installation of a software package, and rebuilding the software package with only these objects rather than installing the entire package again. This also enables an administrator to periodically bring all target machines having a given software package to a pre-determined state of operation, so avoiding dangerous or unauthorised user configuration of a target.

Similarly, an administrator can distribute only Source Host files that have been modified since last distribution time. This again, applies only to Not-Built software packages and only to target machines where the software package has already been installed and committed.

A further technique available is redirected install. This enables support of native installation through execute_xxx_program Actions. The example of FIG. 27 illustrates an SPD for a remote scenario, where a remote directory containing product images is first mounted. A native installation program setup.exe is then run, before unmounting the remote directory. In a local scenario a software package can cause images to be simply copied to a temporary directory before the native installation program is run, and after which images are removed from the temporary directory.

The system also able to support a wide set of reporting options including log files updated at the end of any software distribution operation and events triggered at the end of any software distribution operation.

The log file is preferably stored in a product_dir on a Log Host (the TMR Server) with a default filename: Spname-^version.log Default. Operators can be notified either by e-mail or a Tivoli Enterprise Console (TEC) Event comprising one of: Operation submitted; Operation Successful; or Operation Failed. The log file can also be stored in a historical database. Furthermore, trace files can be generated and located on the product_dir.

What is claimed is:

1. A software deployment tool stored on a computer readable storage medium for use with a software package including a software package file incorporating at least one action defining respective modifications to a client processing system and at least one file required to implement at least one modifying action, said tool comprising:
    a plurality of classes, each class corresponding to a respective type of action wherein the software package comprises a hierarchical structure of leaf and branch nodes capable of being traversed in a top-down manner and each leaf node corresponding to said respective type of action;
    means for reading said software package file and instantiating a class having attributes corresponding to the respective type of each of the at least one action of said software package file and setting the attributes of the at least one class according to the respective action definition in said software package file;
    means for executing a check method on at least one of each of said at least one class instances to determine if a deployment operation can be implemented in a specified first mode;
    means, responsive to a successful check, for executing a first method on each of said at least one class instances in said first mode, said first method stored on the computer readable storage medium; and
    means, responsive to check failure of any class instance, for executing a second method on each of said at least one class instances in a second mode, the second mode being less preferable than the first mode, said second method stored on the computer readable storage medium.

2. A software deployment tool according to claim 1 wherein said deployment operation is one of installation or removal of a software package.

3. A software deployment tool according to claim 1 wherein said first mode is an undoable mode and said second mode is a basic mode.

4. A software deployment tool according to claim 1 wherein said first mode is a basic mode and said second mode is a transactional mode.

5. A computer program product comprising computer program code stored on a computer readable storage medium for, when executed on a computing device, processing a software package file, the program code comprising the software deployment tool of claim 1.

6. A system for deploying software over a computer network, the system comprising:
    a software package including at least one file, the file including definitions of actions involved in a software distribution, wherein the software package includes a hierarchical structure of leaf and branch nodes capable of being traversed from parent to child in a top-down manner, each leaf node corresponding to a respective type of action;
    a management agent configured to receive the software package;
    a target endpoint computer including a software package engine resident on the target endpoint computer, the software package engine configured to receive instructions via the management agent and to deploy said software using a first mode and a second mode; the software package further including:
    a plurality of classes, each class corresponding to said respective type of action;
    at least one class having attributes corresponding to at least one action of said software package file;
    at least one class instance having attributes corresponding to at least one action of said software package file;
    a check method associated with at least one of said at least one class instance configured to determine if a deployment operation can be implemented in a specified first mode;
    a first method responsive to a successful check and associated with at least one class instance in said first mode; and
    a second method responsive to a check failure of any class instance and associated with at least one class instance in a second mode, the second mode being less preferable than the first mode.

7. The system of claim 6, wherein the software package engine is further configured to decode the software package file.

8. The system of claim 6, further comprising a package editor configured to graphically define the software package.

9. The system of claim 6, wherein the hierarchical structure of the software package is serialized.

10. The system of claim 6, wherein the software package is represented by a sequence of stanzas, with each stanza representing an action.

11. The system of claim 10, wherein the stanzas are nested such that stanzas containing other stanzas represent a container action.

12. The system of claim 6, further comprising a preparation and test site configured to transform the software package from one format to another.

* * * * *